US008135992B2

(12) United States Patent
Austin

(10) Patent No.: US 8,135,992 B2
(45) Date of Patent: Mar. 13, 2012

(54) SYSTEMS AND METHODS FOR PROVIDING INTERACTIVE CUSTOMER SUPPORT

(75) Inventor: Andrew Austin, Alpharetta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 115 days.

(21) Appl. No.: 12/423,372

(22) Filed: Apr. 14, 2009

(65) Prior Publication Data
US 2009/0287961 A1 Nov. 19, 2009

Related U.S. Application Data

(60) Provisional application No. 61/045,223, filed on Apr. 15, 2008.

(51) Int. Cl.
*G06F 11/00* (2006.01)
(52) U.S. Cl. ............. 714/37; 714/25; 714/26; 714/30
(58) Field of Classification Search .............. 714/25, 714/26, 30, 37
See application file for complete search history.

(56) References Cited

U.S. PATENT DOCUMENTS

| | | | |
|---|---|---|---|
| 6,813,733 B1 * | 11/2004 | Li et al. .......................... 714/47 |
| 7,467,380 B2 * | 12/2008 | Kurlander et al. ............. 717/174 |
| 2005/0223286 A1 * | 10/2005 | Forster .......................... 714/25 |
| 2006/0294247 A1 * | 12/2006 | Hinckley et al. .............. 709/228 |
| 2007/0069856 A1 * | 3/2007 | Lee .............................. 340/10.1 |
| 2007/0266185 A1 * | 11/2007 | Goddi et al. ..................... 710/8 |
| 2009/0052751 A1 * | 2/2009 | Chaney et al. ................ 382/120 |
| 2009/0106667 A1 * | 4/2009 | Lyle et al. ..................... 715/750 |
| 2009/0109180 A1 * | 4/2009 | Do et al. ....................... 345/173 |
| 2009/0176451 A1 * | 7/2009 | Yang et al. ................... 455/41.2 |

* cited by examiner

*Primary Examiner* — Charles Ehne
(74) *Attorney, Agent, or Firm* — Parks IP Law LLC; Li K. Wang, Esq.

(57) ABSTRACT

A system for providing device diagnostics includes a surface interface operatively linked and in communication with a processor. The surface interface includes a multi-touch interface to detect multiple simultaneous inputs and an object recognition interface to communicate with a device upon the device being placed on the surface interface. The system further includes a memory operatively linked and in communication with the processor, wherein the memory includes a system application configured to: recognize a customer device when the customer device is placed on the surface interface, conduct a diagnostic test to determine whether the device is operating without error, and perform a corrective action if the diagnostic test detects an error.

20 Claims, 25 Drawing Sheets

SYSTEMS AND METHODS FOR PROVIDING INTERACTIVE CUSTOMER SUPPORT

RELATED APPLICATION

This application claims priority to U.S. Provisional Patent Application No. 61/045,223, filed Apr. 15, 2008, which is hereby incorporated by reference, in its entirety.

TECHNICAL FIELD

The present disclosure relates generally to interactive computing and, more particularly, to systems and methods for providing interactive customer support.

BACKGROUND

Public perception of a company is often crafted from a combination of creative marketing, the quality of the products or services offered and, perhaps most important, the quality and consistency of the customer service provided before, during, and after the sale of a product or service.

Many companies have deployed various forms of technology to assist associates in providing effective customer service. As with any technology, early adopters will use a new technology with no or minimal interaction with an associate. Other customers will require some level of explanation by the associate to feel comfortable using a new technology. Still other customers will simply bypass any new technology and seek direct human interaction for their customer service needs. Thus, it can be difficult to isolate what level of technology integration best suits the needs of the associate and the customer as well as being a cost-effective solution for the underlying business.

SUMMARY

According to one aspect of the present disclosure, a system for providing device diagnostics includes a surface interface operatively linked and in communication with a processor. The surface interface includes a multi-touch interface to detect multiple simultaneous inputs and an object recognition interface to communicate with a device upon the device being placed on the surface interface. The system further includes a memory operatively linked and in communication with the processor, wherein the memory includes a system application configured to: recognize a customer device when the customer device is placed on the surface interface, conduct a diagnostic test to determine whether the device is operating without error, and perform a corrective action if the diagnostic test detects an error.

In some embodiments, the system application is configured to conduct one of a display test, a processor performance test, a memory test, an application performance test, a firmware version check, an OS version check, an application version check, and a device component test.

In some embodiments, the system application is configured to perform one of updating firmware, updating software, removing malicious software, and removing a virus.

In some embodiments, the system application is configured to recognize the customer device when the customer device is placed on the surface interface by reading a tag on the customer device. In other embodiments, the system further comprises a short range communications interface and the surface application is configured to recognize the customer device when the customer device is placed on the surface interface by communicating with the device via a short range communications protocol.

Other aspects of the present disclosure include a corresponding method for operating the system and a computer-readable medium including instructions for performing such a method.

DETAILED DESCRIPTION

As required, detailed embodiments of the present disclosure are disclosed herein. It must be understood that the disclosed embodiments are merely exemplary examples of the disclosure that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

Figure 1:
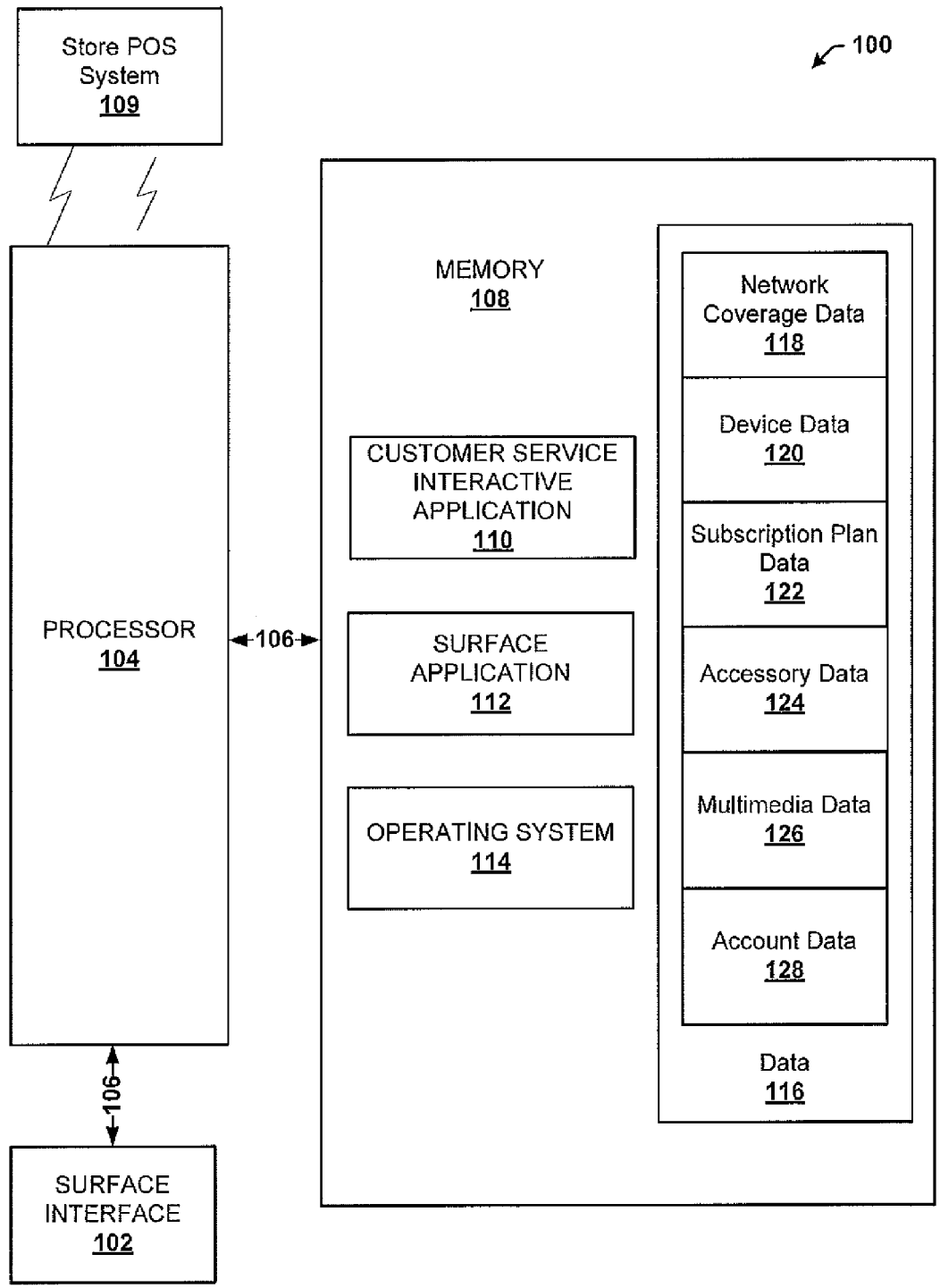
FIG. 1 schematically illustrates an exemplary power selling system (PSS), according to the present description.

Referring now to the drawings wherein like numerals represent like elements throughout the several views, FIG. 1 schematically illustrates an exemplary power selling system (PSS) 100 in which embodiments of the present disclosure can be implemented. The PSS 100 is configured to assist customers in purchasing various products or services. In the illustrated embodiment, the PSS 100 is configured to assist customer in purchasing mobile devices and service plans from a wireless service provider. Particularly, the PSS 100 can aid the customer in selecting one or more mobile handsets by providing device specifications, offering a device comparison option in which two or more devices can be compared, selecting a subscription plan, selecting add-on plans, selecting accessories, configuring a mobile handset, transferring contact information and profile settings from a customer's old device to a new device, activating a wireless service, viewing a network coverage map, and completing a transaction directly from the PSS 100.

The PSS 100 finds particular application to wireless communication services and, as such, embodiments of the present disclosure are described in context of a tool to aid a sales associate in selling wireless communication services and mobile devices to a customer in a store environment. It should be understood, however, that the PSS 100 can be implemented as a self-selling tool whereby a customer needs no assistance outside of the prompts of the PSS 100 to complete a transaction for one or more devices and services.

By way of example, the wireless service provider can be configured to provide wireless communications services via a 2G GSM (Global System for Mobile communications) network and can provide data communications via GPRS (General Packet Radio Service), and EDGE (Enhanced Data rates for GSM. Evolution). By way of further example, the wireless communications network can be configured as a 3G UMTS (Universal Mobile Telecommunications System) network and provide data communications via the HSPA (High-Speed Packet Access) protocol family, such as, HSDPA (High-Speed Downlink Packet Access), EUL (Enhanced Uplink) or otherwise termed HSUPA (High-Speed Uplink Packet Access), and HSPA+ (Evolved HSPA). The wireless communications network is also compatible with future mobile communications standards including, but not limited to, pre-4G and 4G, for example. The wireless service provider can be further configured to provide messaging services via Short Message Service (SMS), Multimedia Message Service (MMS), instant messaging, and unstructured supplementary service data (USSD), for example. The wireless service provider can also be configured to provide voicemail messaging features, such as plain old voicemail and visual voicemail. The wireless service provider can also offer premium services such as, but not limited to, video share, mobile television, video chat, mobile radio, and the like.

The illustrated PSS 100 includes a surface interface 102. In an exemplary embodiment, the surface interface 102 is a MICROSOFT® SURFACE™ touch screen system. The MICROSOFT® SURFACE™ technology uses a near-infrared LED light source aimed at the touch screen. When an object touches the surface interface 102, the light is reflected to multiple infrared cameras allowing the PSS 100 to react to items in contact with the surface interface 102.

The MICROSOFT® SURFACE™ touch screen interface includes four main components: direct interaction, multi-touch contact, a multi-user experience, and object recognition. Direct interaction refers to a user's ability to interact directly with the touch screen without the need for a peripheral device, such as a mouse, keyboard, or stylus, for example. Multi-touch contact refers to the ability of one or more users to touch the interface at multiple contact points. Multi-user is a benefit of multi-touch that allows several people interact with the interface simultaneously. For example, a customer and a sales associate can simultaneously interact with the surface interface 102 during a product or service coverage demonstration. Object recognition refers to an ability to recognize the presence and orientation of an object placed on the interface. In one embodiment, object recognition is realized via a tag placed on the object that is recognized by one or more cameras within the surface interface 102. In another embodiment, an object is configured with software to communicate with the surface interface via short range communications, Wi-Fi®, Bluetooth®, near-field communications (NFC), radio frequency identification (RFID), and the like. In the illustrated embodiments, the object is a mobile device. Alternatively, the object can be a device accessory, a direct mail paper, advertisement or other promotional material that includes a tag, and the like. A tag can be embodied as a barcode tag, a data matrix tag, a single dimension tag, a multiple dimension tag, a black and white tag, a multi-color tag, or any other tag that can be read by the surface interface 102 to distinguish among various devices.

The illustrated surface interface 102 is operatively linked and in communication with a processor 104 via a data/memory bus 106. The processor 104 is operatively linked and in communication with a memory 108 via the data/memory bus 106.

The word "memory," as used herein to describe the memory 108, collectively refers to all memory types associated with the PSS 100 such as, but not limited to, processor registers, processor cache, random access memory (RAM), other volatile memory forms, and non-volatile, semi-permanent or permanent memory types; for example, tape-based media, optical media, flash media, hard disks, combinations thereof, and the like. While the memory 108 is illustrated as residing proximate the processor 104, it should be understood that the memory 108 can be a remotely accessed storage system, for example, a server on the Internet, a remote hard disk drive, a removable storage medium, a short range communication networked drive, combinations thereof, and the like. Moreover, the memory 108 is intended to encompass network memory and/or other storage devices in wired or wireless communication with the PSS 100. Thus, any of the data, applications, and/or software described below can be stored within the memory 108 and/or accessed via network connections to other data processing systems, such as a store point-of-sale (POS) system 109 that can be in communication with the PSS 100 via a wired or wireless connection. Accordingly, the present disclosure may operate on the PSS 100, wherein the PSS 100 is configured as a server to one or more client data processing systems as dictated by a client/server model.

The memory 108 is illustrated as including a customer service interactive application (CSIA) 110, a surface application 112, an operating system 114, and data 116. The CSIA 110 is a software application. The CSIA 110 can include branding for a wireless service provider. The CSIA 110 can include exploration options by which a customer can navigate a network coverage map, view various mobile devices, compare mobile devices, view mobile device features, view feature video demonstrations, view service subscription plans, view add-on service plans, view mobile device specifications, view compatible accessories, view mobile device highlights, view mobile device color options, compare two or more handsets, perform device diagnostics, upgrade an account, upgrade a mobile device, and the like. The surface application 112 can include software developed to interact with the surface interface 102 hardware to facilitate multi-touch and object recognition features of the surface interface 102. The surface application 112 also provides a path of communication between the surface interface 102 hardware and the CSIA 110. It is contemplated that the surface interface 102 can be configured such that a surface application 112 can be embedded in a local memory (not shown) of the surface interface 102. The operating system 114 includes software that controls the operation of the PSS 100 and directs the processing of applications, such as the surface application 112 and the CSIA 110. The operating system 114 is further configured to manage the memory 108 and control I/O functions of the surface interface 102 alone or in combination with the surface application 112. The operating system 114 can be any operating system such as, but not limited to, MICROSOFT®

WINDOWS® based operating system, UNIX based operating systems, or a proprietary operating system, for example.

The memory 108 includes data 116. The data 116 can be used by at least one of the CSIA 110, the surface application 112, and the operating system 114. The illustrated data 116 includes network coverage data 118, device data 120, subscription plan data 122, accessory data 124, multimedia data 126, and account data 128.

The network coverage data 118 can include data relevant to the coverage available via one or more network types, such as, but not limited to, voice coverage, data coverage, Wi-Fi® coverage, 2G coverage, 3G coverage, pre-4G coverage, 4G coverage, broadband Internet coverage, television coverage, IPTV coverage, VoIP coverage, any combination thereof, and the like. The network coverage data 118 can be of any granularity, such as, but not limited to, world view, continent view, country view, regional view, state view, city view, town view, street-level view, and the like.

The device data 120 can include data relevant to one or more devices offered by a wireless service provider, such as, but not limited to, a cellular telephone, a mobile handset, a mobile terminal, mobile equipment, a smartphone, wireless-enabled PDA, a handheld computer, a video game device, or other mobile device, a digital music player, and the like. The device data 120 can include device specifications, device features, device feature demonstrations, device highlights, device images, devices color options, device configuration options, device-specific multimedia, device firmware, device software, device-specific diagnostic software, general diagnostic software, and the like.

The subscription plan data 122 can include data relevant to one or more subscription plans and add-on plans offered by a wireless service provider, such as, but not limited to, a voice plan, a data plan, a text messaging plan, a multimedia messaging plan, a visual voicemail plan, a plain old voicemail plan, an enhanced voicemail plan, a video share plan, a mobile television plan, a music rental plan, a movie rental plan, a television episode rental plan, a music purchase plan, a movie purchase plan, a television episode purchase plan, a landline voice plan, a broadband Internet plan, a television plan, an IPTV plan, any combination thereof, and the like. The plans can be offered at any monetary value and may be a charged as a monthly reoccurring charge or a one time charge. Further, subscription plan data 122 can include data for pre-paid, post-paid plans, and add-on plans.

The accessory data 124 can include data relevant to the one or more accessories offered by a wireless service provider, such as, but not limited to, wireless mono headsets (e.g., a Bluetooth® mono headset), wireless stereo headsets (e.g., a Bluetooth® stereo headset), wired hands-free accessories, headphones, ear buds, internal memory, external memory, removable memory, hard cases, soft cases, protective films, skins, faceplates, modification kits, user-replaceable parts, wall charger, car charger, travel charger, car mount, car integration kits, audio cables, cradles, connection cables, software, battery packs, quick-charge devices, remote control, replacement parts, any combination thereof, and the like. The accessory data 124 can include generic accessories and device-specific accessories.

The multimedia data 126 can include data relevant to multimedia offered by a wireless service provider or a partner, such as, but not limited to, ringtones, ringback tones, music, sound effects, start-up sounds, shutdown sounds, calling party alert tones, wallpaper, images, video, movies, television episodes, video games, any combination thereof, and the like. The multimedia data 126 can be offered for purchase and/or rental.

The account data 128 can include data relevant to a customer's account, such as, but not limited to, present subscription plan(s), present add-on plan(s), past subscription plan(s), past add-on plan(s), recommended upgrade plan, eligible discounts, eligible incentives, device upgrade eligibility, device type, device make, device model, International Mobile Subscriber Identity (IMSI), International Mobile Equipment Identity (IMEI), Mobile Subscriber ISDN (MSISDN), device serial number, customer name, customer alias, customer user name, password, customer security question, PIN, SIM data, customer home address, customer alternate address (e.g., work address), home telephone number, credit information, credit card information, billing information, account standing, automatic payment status, any combination thereof, and the like.

Figure 2:
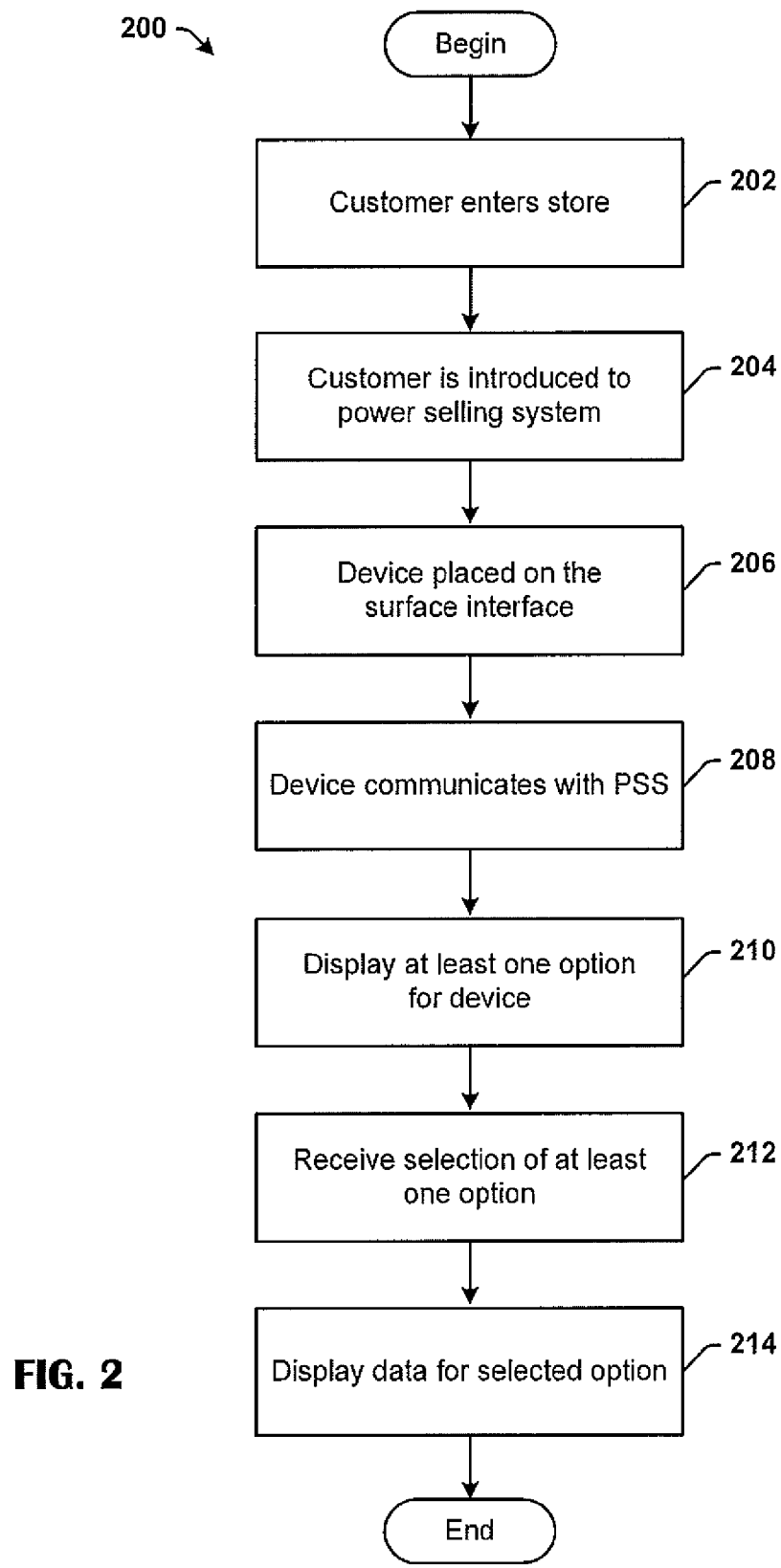
FIG. 2 schematically illustrates an exemplary method of operating an exemplary PSS, according to the present description.

FIG. 2 schematically illustrates a method 200 for operating a PSS 100, according to an exemplary embodiment of the present disclosure. It should be understood that the steps of the method 200 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 200 can be ended at any time. Some or all steps of this process, and/or substantially equivalent steps, can be performed by execution of computer-readable instructions included on a computer readable medium, such as the memory 108.

The method 200 begins and flow proceeds to block 202 wherein a customer enters a store. At block 204, the customer is introduced to the PSS 100, for example, by a sales associate. The PSS 100 can be configured such that the customer can proceed to use the PSS 100 in a self-guided fashion or can be guided by a sales associate. In either case, the customer can be instructed to select a device and place the device on the surface interface 102, at block 206. The device can be a demo model of a device or can be the customer's device. A demo model can allow a user to interact with the device to develop an understanding of the available features of the device, compare the device to other devices, and otherwise aid the customer in a purchase decision. A demo model device can interact with the PSS 100 to present prospective customers with data 116 as described above.

After a customer has purchased a device and the device is tagged appropriately to identify the customer, the customer can place the device on the surface interface 102. A customer's device can interact with the PSS 100 to add, delete, or otherwise modify data stored on the device including, but not limited to, contacts, multimedia data 126, account data 128, any combination thereof, and the like. Further, a customer can use the PSS 100 to upgrade their subscription plan, add new subscription or add-on plans, check for device upgrade eligibility, perform device diagnostics, any combination thereof, and the like. The method 200 described herein is equally suitable for a new customer that does not yet have a device and a returning customer.

At block 208, the device communicates with the PSS 100 via various methods including, but not limited to, short range wireless communications and/or a tag on or proximate the device. This communication informs the PSS 100 of the device that was placed on the surface interface 102. In response, the PSS 100 can retrieve network coverage data 118, device data 120, subscription plan data 122, accessory data 124, multimedia data 126, and account data 128, for example.

At block 210, the PSS 100 can display at least one option available for the device. In one embodiment, for example, when a customer is a prospective customer investigating new devices, the PSS 100 can display an option to view a coverage map, view device features, compare devices, view subscription plans, view add-on plans, view device highlights, view device color options, and view device specifications, for example. In another embodiment, for example, when a customer is a returning customer, the PSS 100 can display an option to add, delete, or otherwise modify data stored on the device, modify account information, modify subscription plans, modify add-on plans, add subscription plans, upgrade an existing plan, add add-on plans, upgrade a device, purchase content, perform device diagnostics, pay a bill, any combination thereof, and the like. At block 212, the PSS 100 can receive a selection of an option. The data associated with the selected option can be displayed, at block 214. The method 200 can end.

It is contemplated that the aforementioned method can be applied to additional scenarios. For example, the options can further include a checkout option whereby a customer can purchase a device, accessories, multimedia content, and the like directly from the PSS 100. In accordance with this embodiment, the PSS 100 can communicate with the POS system 109 for processing payment information, updating inventory, provisioning service, and activating devices. It is contemplated that any of these processes can occur partially or wholly at the PSS 100 and with or without the aid of a customer service agent.

The PSS 100, in combination with a device and associated wireless account, can also be used to facilitate the purchase of goods and services at any place of business including, but not limited to, restaurants, grocery stores, food markets, hardware stores, gas stations, convenience stores, membership warehouses, retail stores, outlet malls, discount stores, clothing stores, music stores, movie stores, video game stores, vehicle dealerships, movie theaters, live action theater, and the like.

In this example, the device can be configured with checkout software to perform electronic transactions. The device with the check-out software installed can be placed on the surface interface 102 and an option can be displayed to provide payment via the device. Selection of this option can process a transaction between the device and the PSS 100. The device or the PSS 100 can communicate with the wireless service provider, for example, via a dedicated network node to report the transaction. The transaction can be logged and billed to the customer. The wireless service provider can charge a fee to the customer and/or the business to use this service. In some embodiments, any charges can be posted to a customer's wireless account whereby the wireless account functions as a charge or a credit account, for example.

Figure 3:
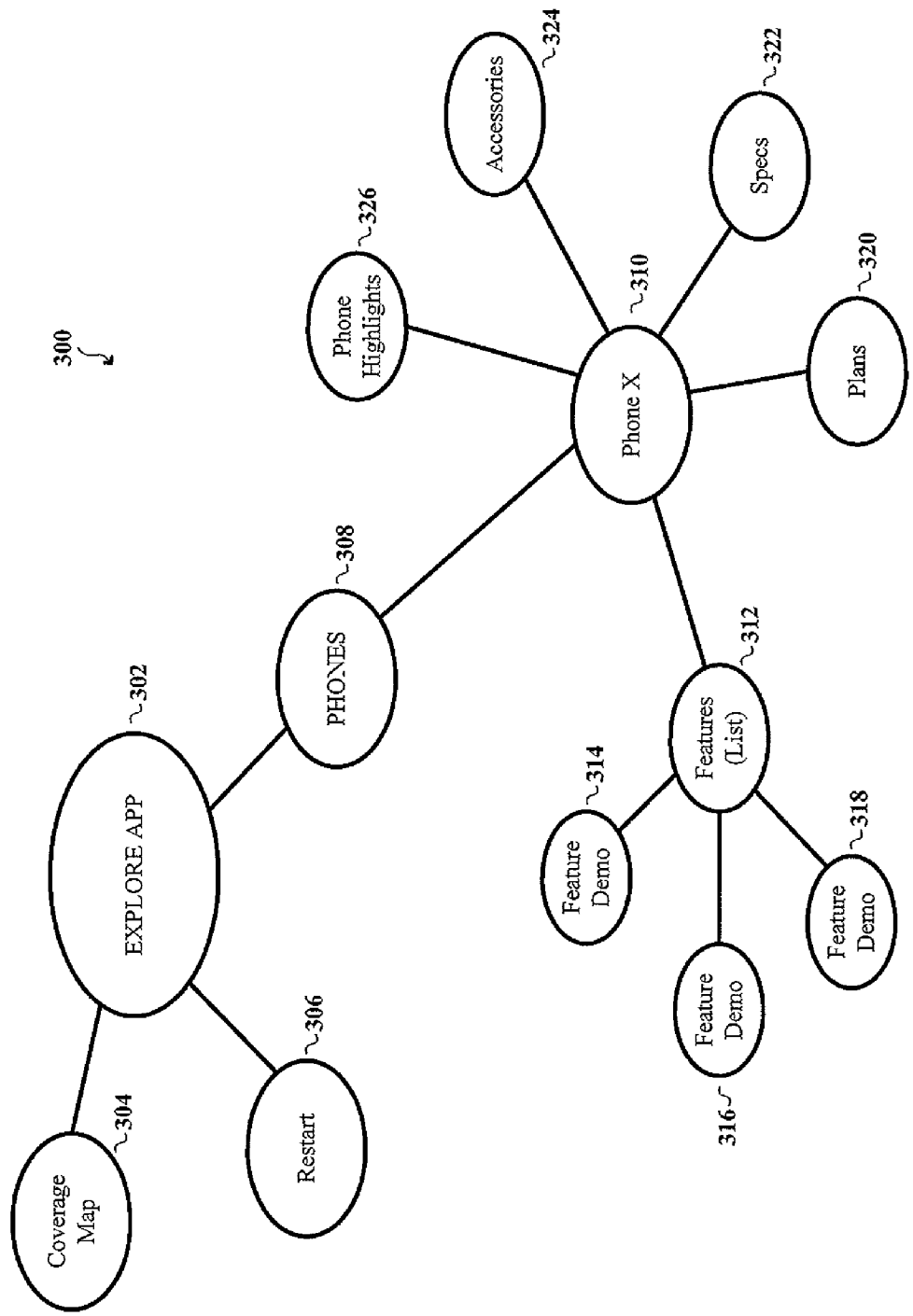
FIG. 3 schematically illustrates an exemplary customer service interactive application (CSIA), of an exemplary PSS, according to the present description.

Referring now to FIG. 3, a block diagram of an exemplary application flow 300 of the CSIA 110 is schematically illustrated, according to an embodiment of the present disclosure. The illustrated application flow 300 includes an application core 302 that can be, for example, a start or main screen that a user is presented when starting the CSIA 110. The application core 302 can provide a gateway for access to a coverage map 304, a system and/or application restart 306, and a device database 308. The device database 308 can provide access to device data 120 for at least one device offered by a wireless service provider. As illustrated, the application flow 300 can expand upon selection of a device (e.g., "phone X") 310. A feature view 312 can expand from the selection of a feature list option and can include further options to view feature demos 314, 316, 318. A subscription plan view 320 can expand from the selection of a subscription plan option. A specification view 322 can expand from the selection of a specification option. An accessories view 324 can expand from the selection of an accessories option. A device highlights view 326 can expand from the selection of a device highlights option. Other options and views are contemplated, such as, but not limited to, a device diagnostics option, a firmware/software update option, a device upgrade option, a performance analysis option, any combination thereof, and the like.

Figure 4:
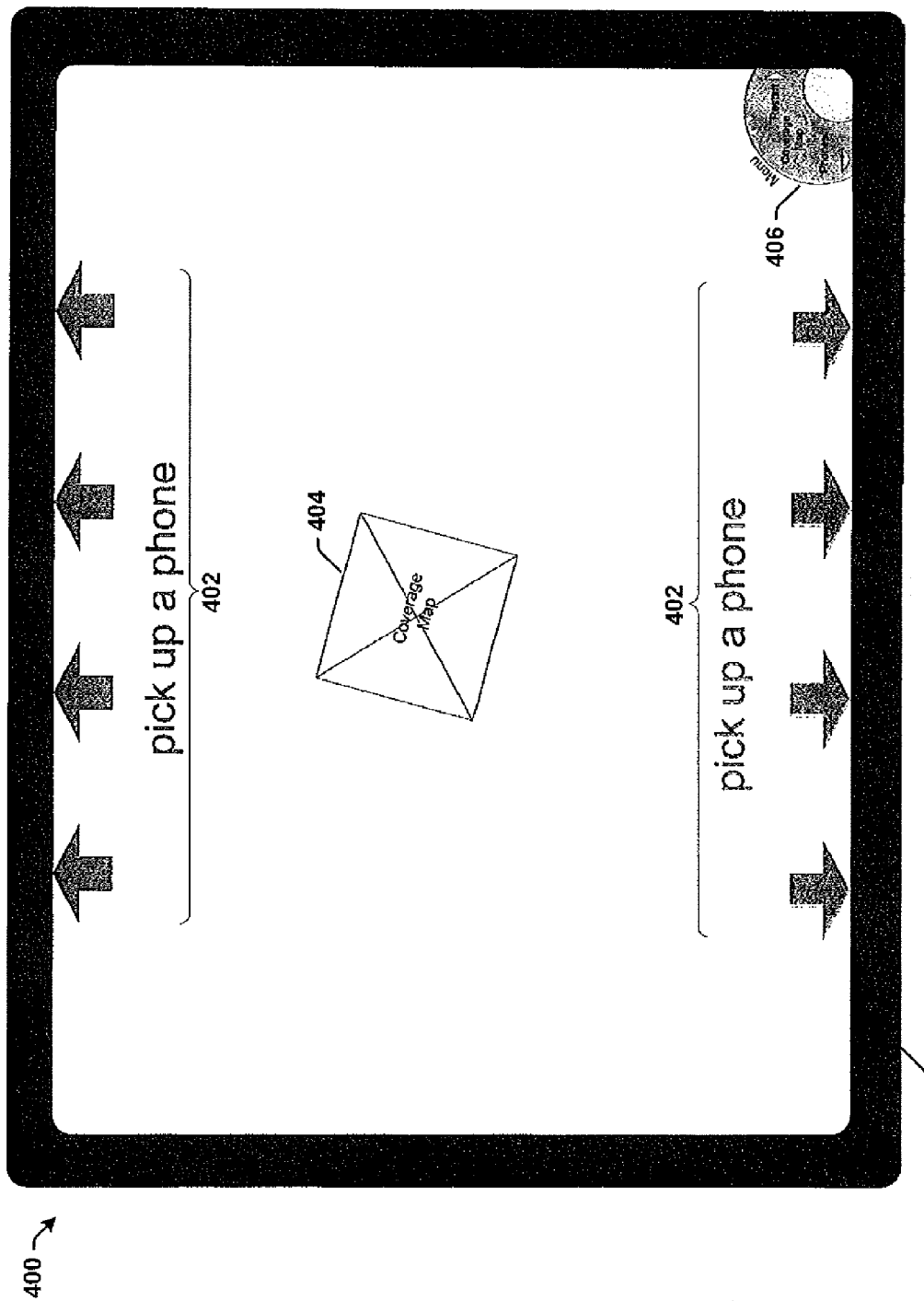
FIGS. 4-19 show representative images from an exemplary surface user interface (SUI), according to the present description.

Referring now to FIG. 4, a representative image from a surface user interface (SUI) 400 is illustrated, according to an exemplary embodiment of the present disclosure. The illustrated SUI 400 is displayed on the surface interface 102 and includes a phone selection area 402, a coverage map 404, and an option menu 406. The phone selection area 402 can be used to instruct a user to pick up a device. It is contemplated that the phone selection area 402 can include a notation of each device available for use with the surface interface 102. The coverage map 404 can present network coverage data in a map format of adjustable granularity. The option menu 406 can include any options that are currently available. The illustrated option menu 406 includes an option to view phones, view the coverage map 404, and restart the system and/or application.

Figure 5:
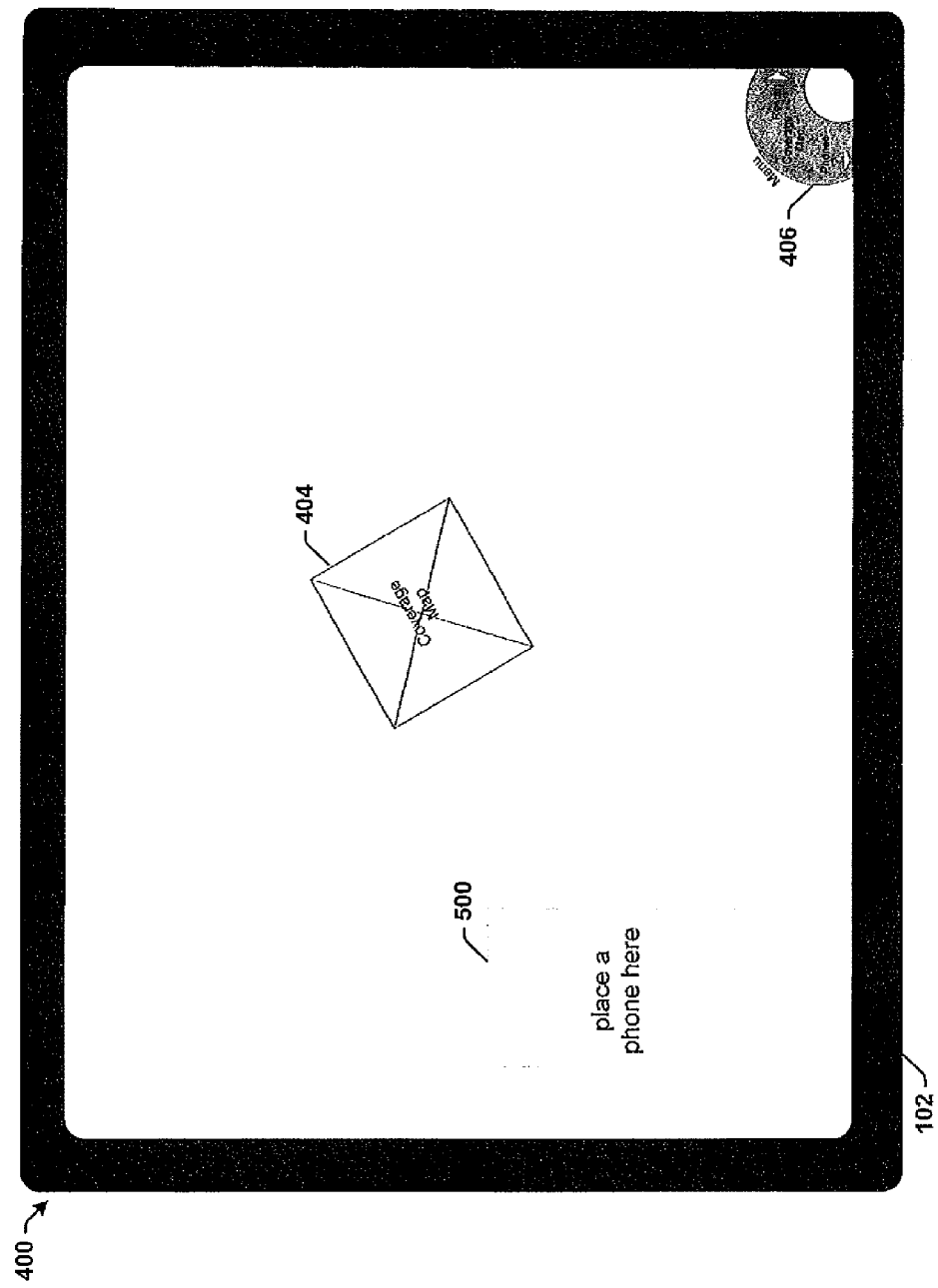

Referring now to FIG. 5, another representative image from a SUI 400 is illustrated, according to an exemplary embodiment of the present disclosure. The illustrated SUI 400 is displayed on the surface interface 102 and includes a device placeholder 500, the coverage map 404 and the option menu 406. It should be noted that the device placeholder 500 can be positioned anywhere in the SUI 400 to guide the user in placing a device on the surface interface 102. The device placeholder 500 can be temporary, permanent, or may be excluded from the SUI 400, for example.

Figure 6:
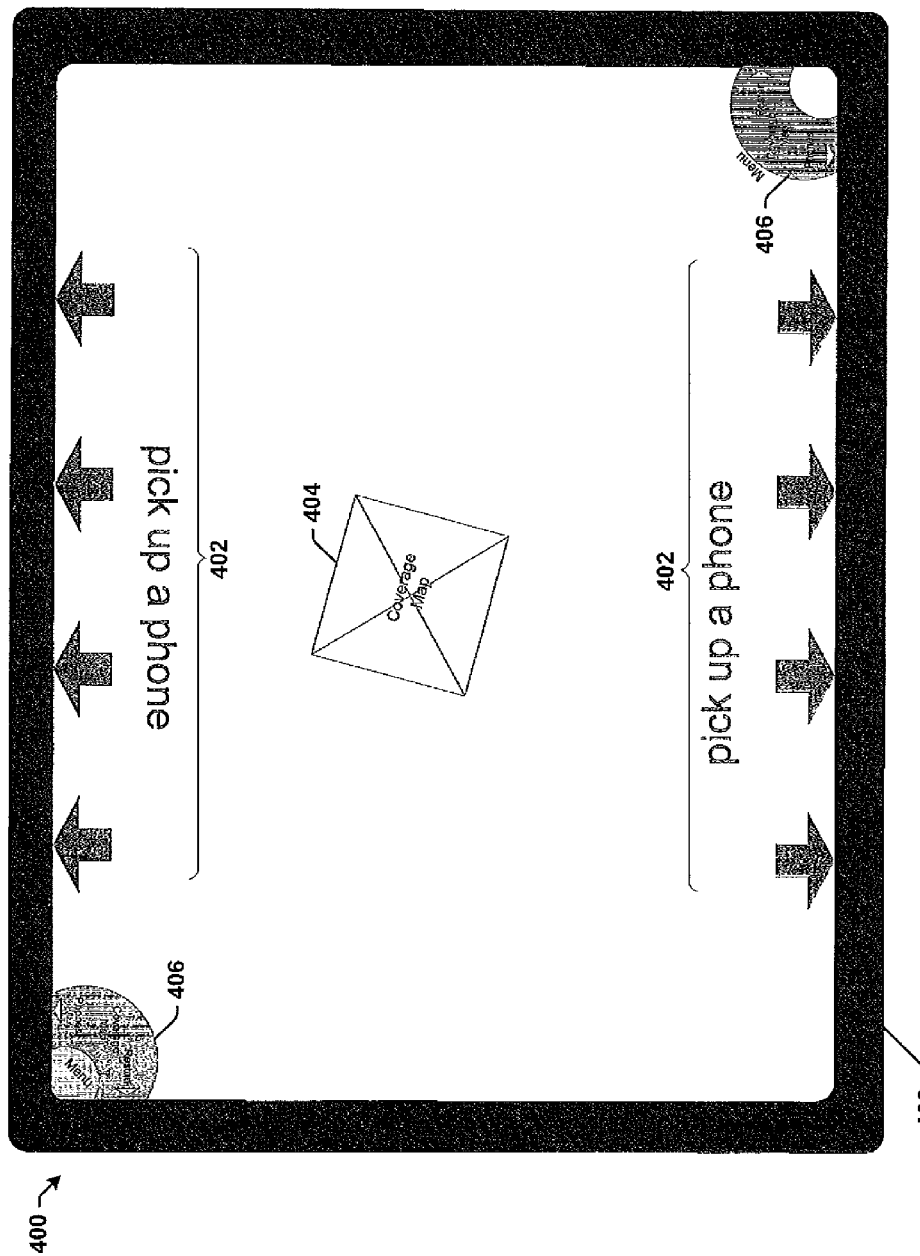

Referring now to FIG. 6, another representative image from a SUI 400 is illustrated, according to an exemplary embodiment of the present disclosure. The illustrated SUI 400 is displayed on the surface interface 102 and includes all the elements of FIG. 4 with the addition of a second option menu 406 to facilitate at least one additional user.

Figure 7:
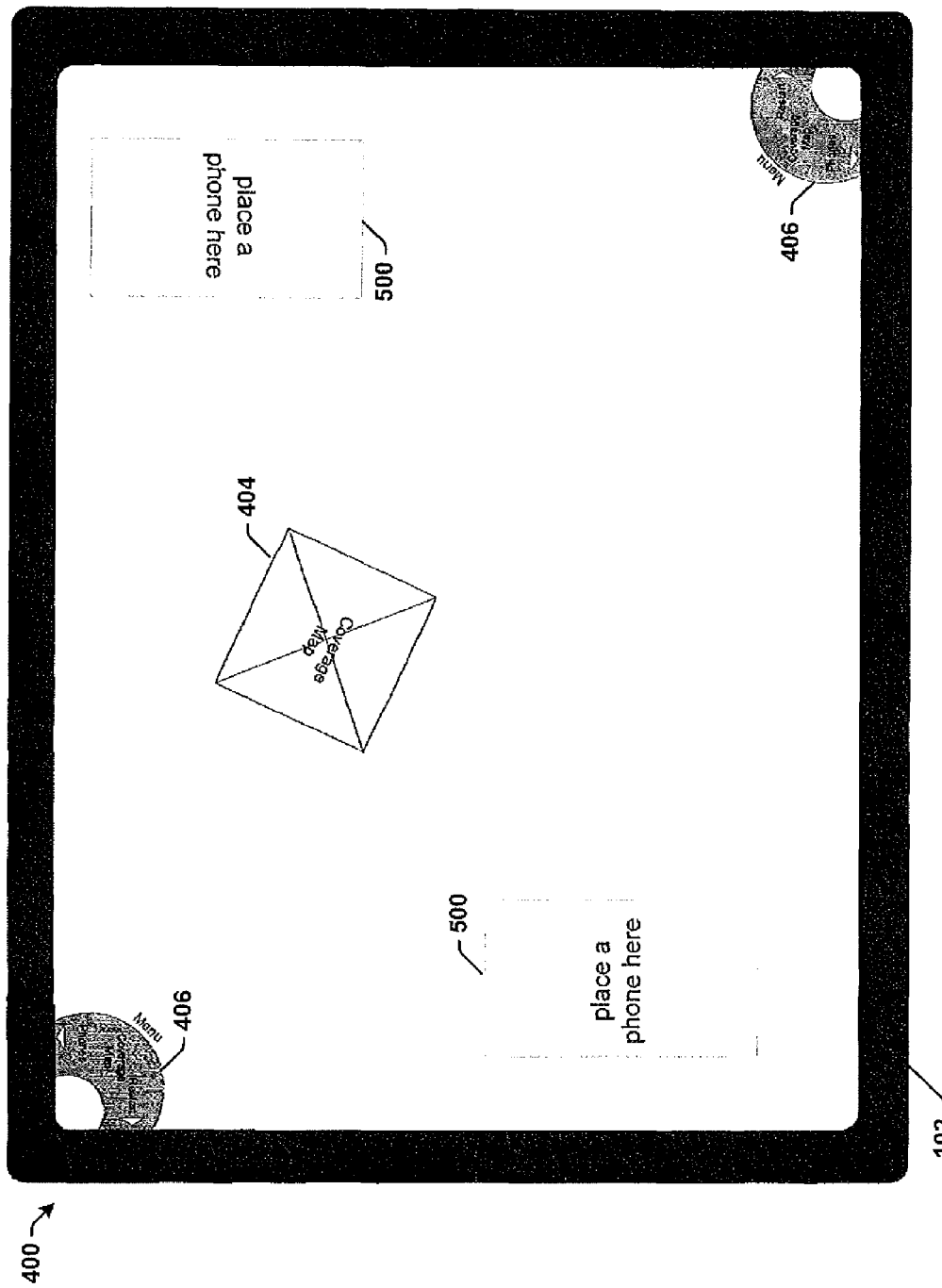

Referring now to FIG. 7, another representative image from a SUI 400 is illustrated, according to an exemplary embodiment of the present disclosure. The illustrated SUI 400 is displayed on the surface interface 102 and includes all the elements of FIG. 5 with the addition of a second device placeholder 500 and a second option menu 406 to facilitate an additional user.

Figure 8:
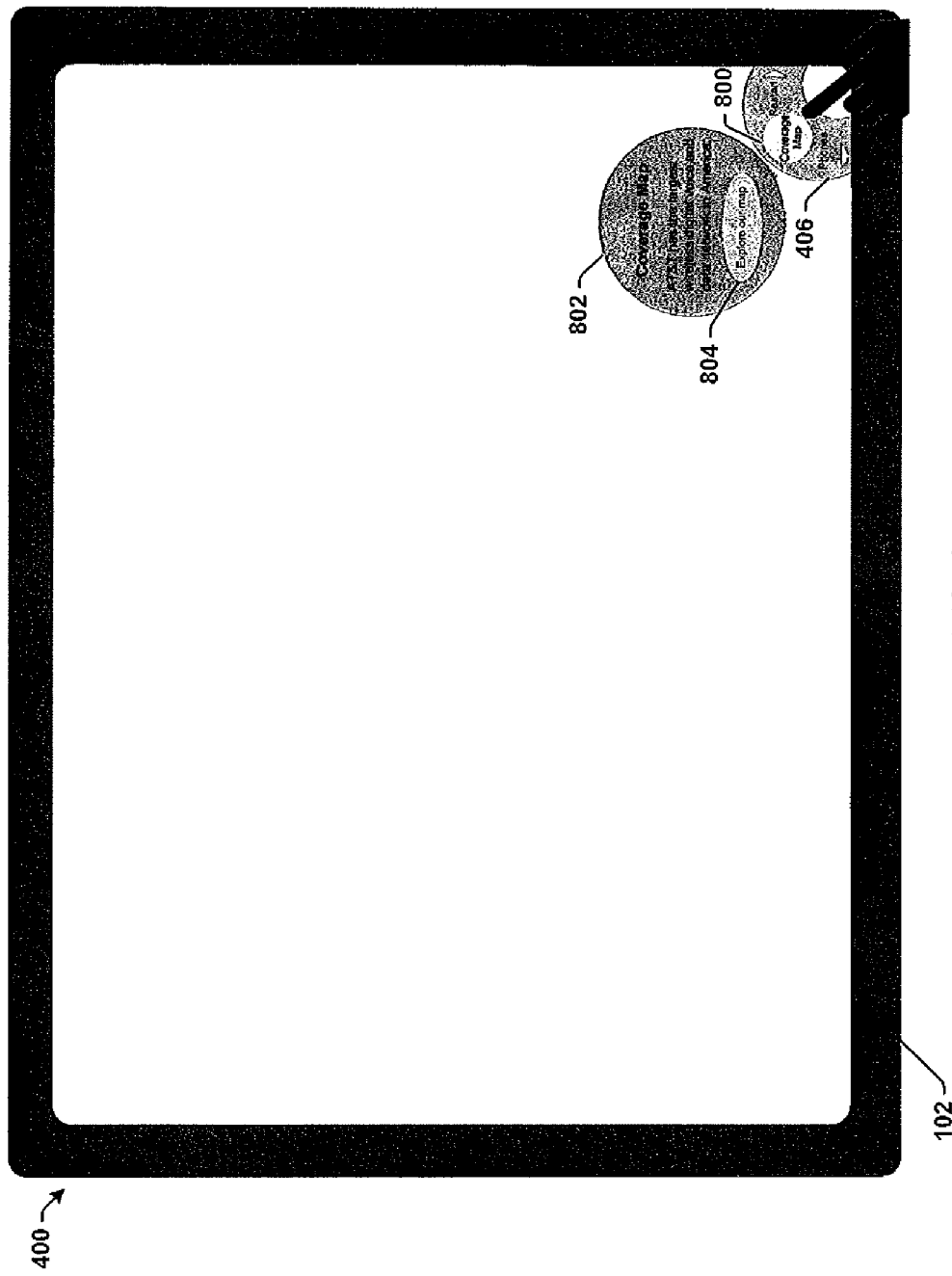

Referring now to FIG. 8, another representative image from a SUI 400 is illustrated, according to an exemplary embodiment of the present disclosure. The illustrated SUI 400 is displayed on the surface interface 102 and includes the option menu with a coverage map option 800 selected. A coverage map information window 802 can appear upon selection of the coverage map option 800 and provide information regarding the wireless service provider's network coverage and an explore option 804 to explore the coverage map.

Figure 9:
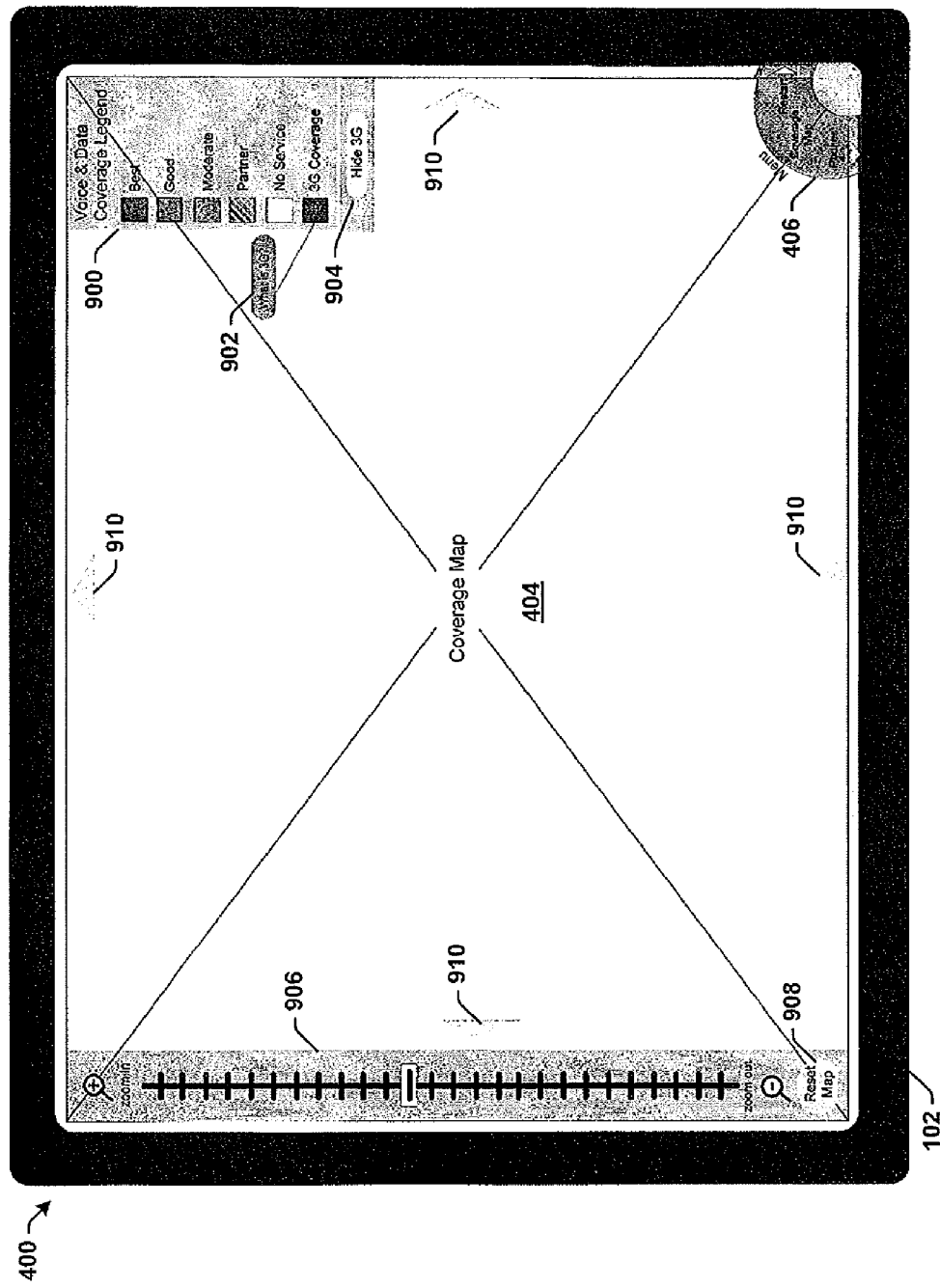

Referring now to FIG. 9, another representative image from a SUI 400 is illustrated, according to an exemplary embodiment of the present disclosure. The illustrated SUI 400 is displayed on the surface interface 102. The illustrated SUI 400 includes the coverage map 404 in an expanded view and the option menu 406. The illustrated SUI 400 further includes a coverage legend 900 that can include voice coverage, data coverage, Wi-Fi® coverage, and coverage for different network types, such as 2G and 3G, for example. The coverage legend can also include coverage for other services, such as, but not limited to, broadband Internet, television, IPTV, combinations thereof, and the like. The coverage legend 900 can include an information window 902 whereby a customer can view additional information about the levels of coverage and/or network types. The coverage legend 900 can further include a show/hide option 904 for any of voice coverage, data, coverage, 2G coverage, 3G coverage, and other coverage types not shown, for example. In the illustrated example, the show/hide option 904 is set to show 3G coverage.

The illustrated SUI 400 further includes a zoom feature bar 906, a reset map option 908, and directional arrows 910. The zoom feature bar 906 can provide a zoom feature whereby a user can control a zoom in feature and a zoom out feature. The reset map option 908 can be used to reset the map to an original position, for example. The directional arrows 910 can be used to navigate the map. It is also contemplated that a zoom feature and navigation can be accomplished via multi-touch gestures, such as wiping, pinching, and expanding gestures using one or more fingers, for example.

Figure 10:
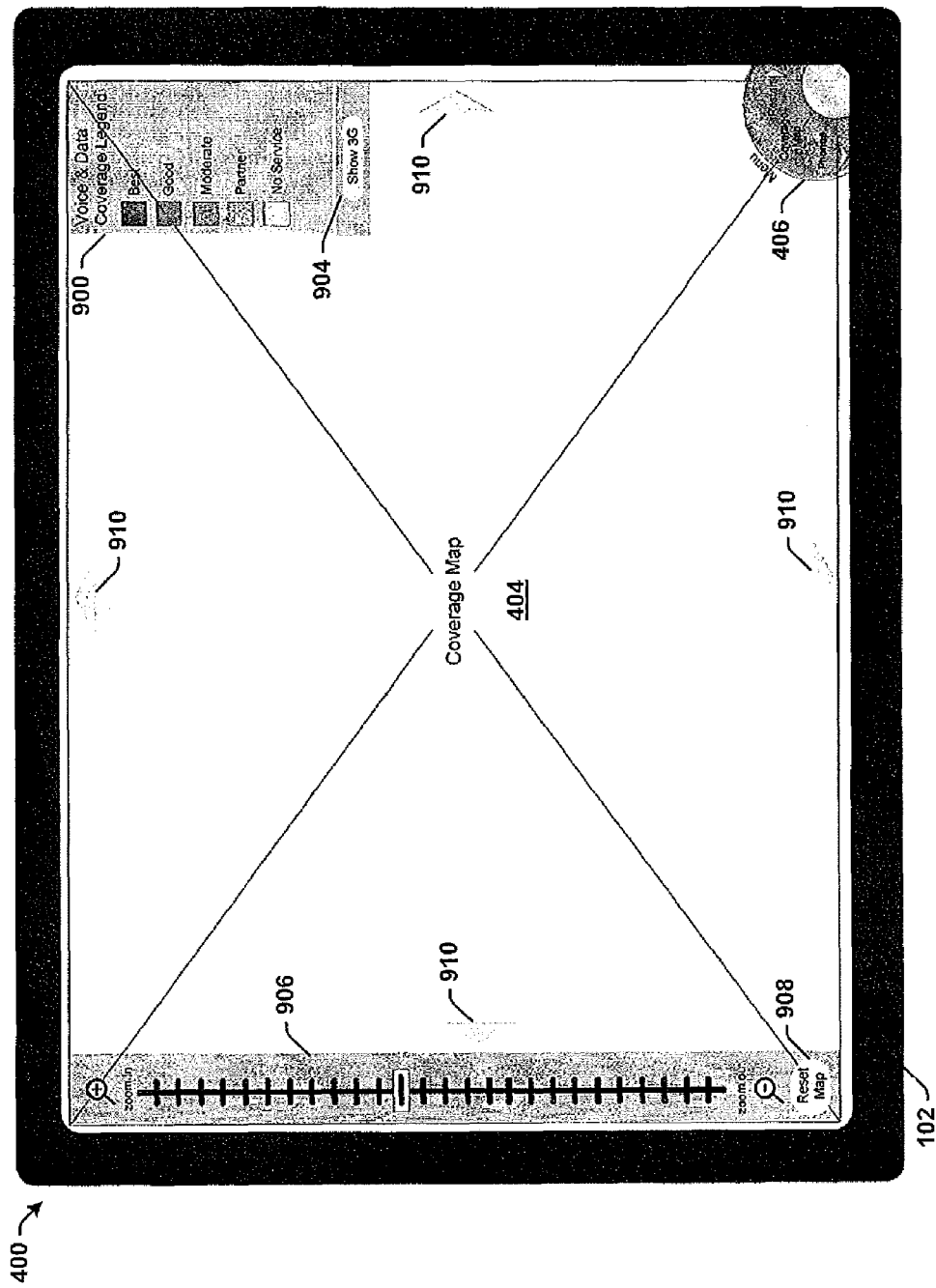

Referring now to FIG. 10, another representative image from a SUI 400 is illustrated, according to an exemplary embodiment of the present disclosure. The illustrated SUI 400 is displayed on the surface interface 102 and includes all the elements of FIG. 9. The show/hide option 904, however, is set to show 3G coverage. A similar show/hide option 904 can be provided for other network types.

Figure 11:
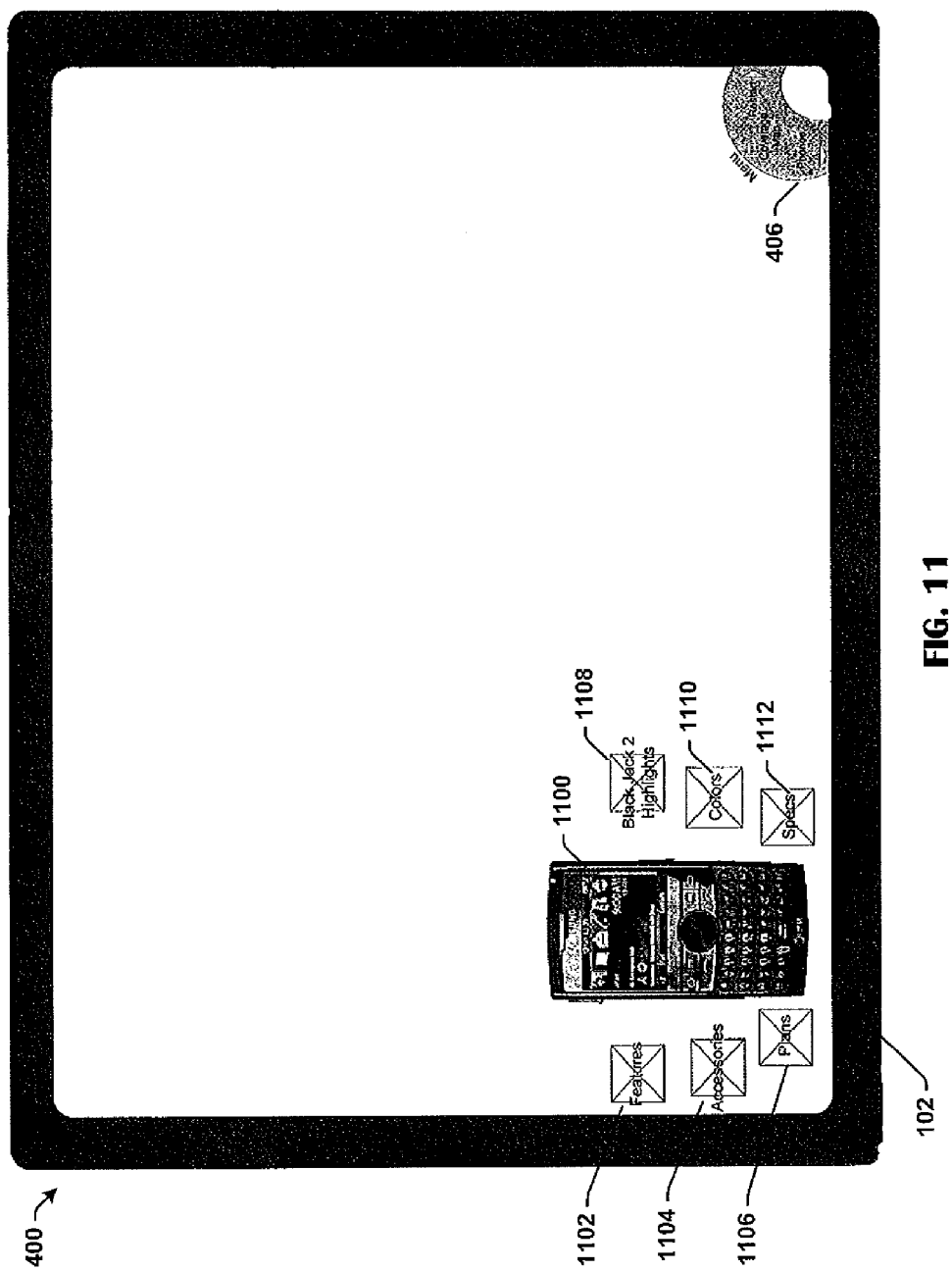

Referring now to FIG. 11, another representative image from a SUI 400 is illustrated, according to an exemplary embodiment of the present disclosure. The illustrated SUI 400 is displayed on the surface interface 102. The illustrated SUI 400 includes the option menu 406, an actual device 1100 (as opposed to a virtual representation such as a device image), a feature option 1102, an accessories option 1104, a subscription plan option 1106, a device highlights option 1108, a device color option 1110, and a specifications option 1112. The actual device can be any device and is not limited to the device make, model, or version illustrated. The device 1100 can be configured with a tag and/or software to communicate with the PSS 100. The feature option 1102 can provide access to device features. The accessories option 1104 can provide access to device accessories. The subscription plan option 1106 can provide access to subscription plans generally available from the wireless service provider and/or those specific to the device 1100. The device highlights option 1108 can provide device highlights, for example, of the most popular features of the actual device 1100. The device color option 1110 can provide device color options available for the actual device 1100. The specifications option 1112 can provide detailed device specifications.

Figure 12:
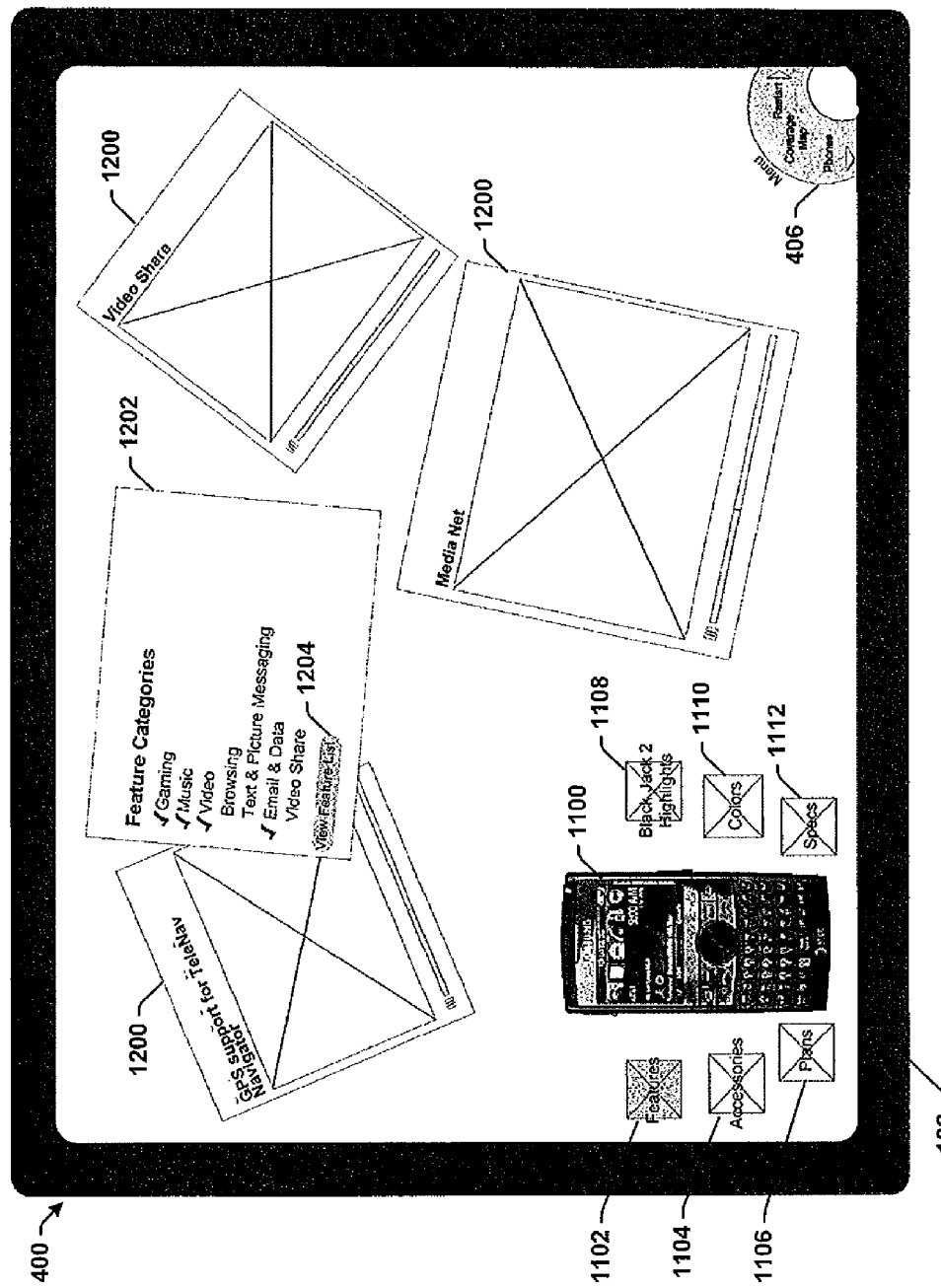

Referring now to FIG. 12, another representative image from a SUI 400 is illustrated, according to an exemplary embodiment of the present disclosure. The illustrated SUI 400 is displayed on the surface interface 102 and includes all the elements of FIG. 11. As illustrated, the feature option 1102 is selected and accordingly at least one feature video window 1200 can be displayed. The illustrated feature video windows 1200 provide video demonstrations of a GPS feature, a video share feature, and a media feature. Feature video demonstrations can be made and used for any feature offered for the device. A feature category window 1202 can provide a categorized summary of all the supported features of the device 1100. A view feature list option 1204 can display, upon selection, a detailed feature list of the entire feature set available for the device 1100.

Figure 13:
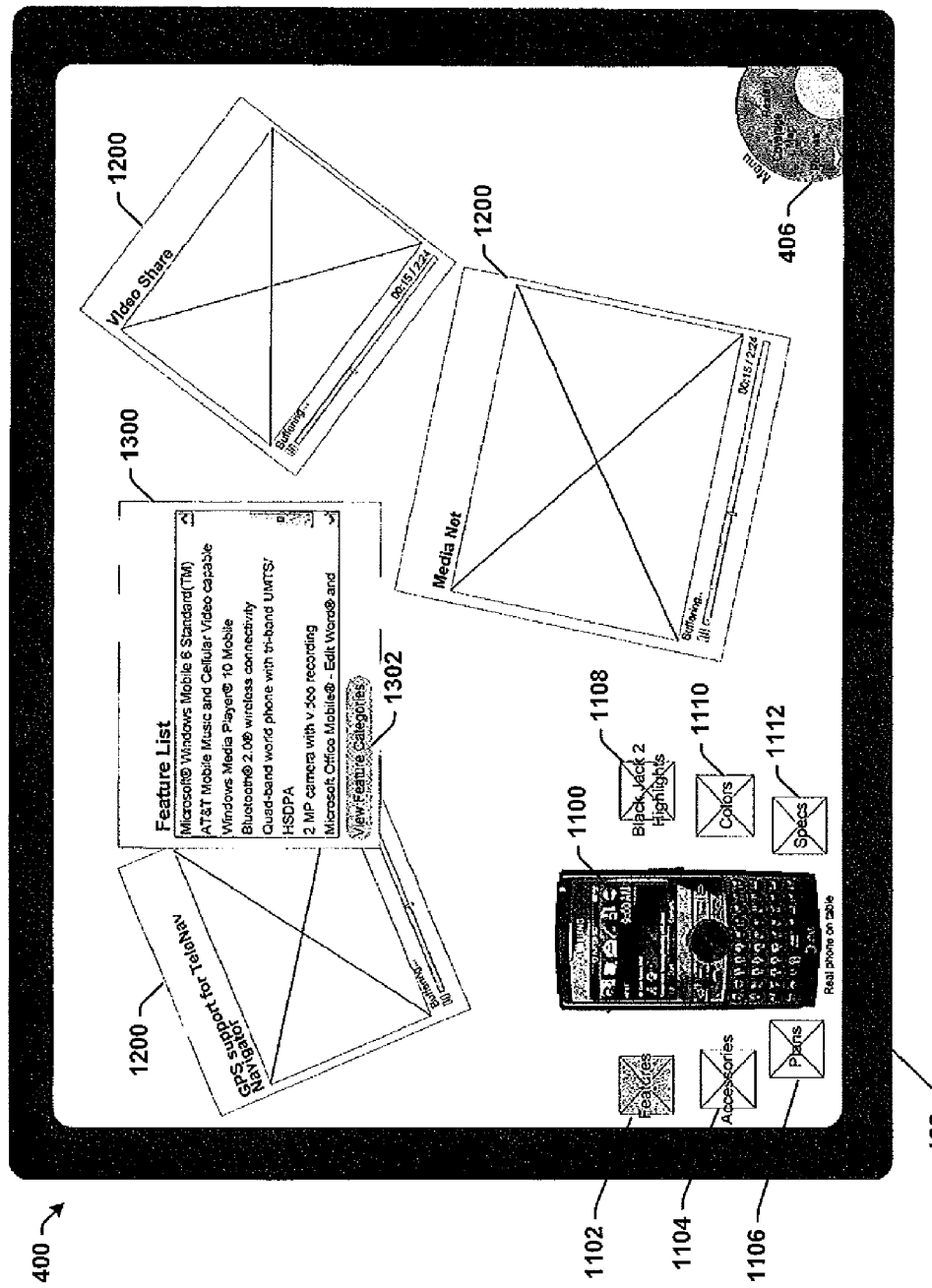

Referring now to FIG. 13, another representative image from a SUI 400 is illustrated, according to an exemplary embodiment of the present disclosure. The illustrated SUI 400 is displayed on the surface interface 102 and includes all the elements of FIG. 11 and the feature video windows 1200 of FIG. 12. As illustrated, the feature option 1102 is selected and accordingly at least one feature video window 1200 can be displayed. A feature list window 1300 can provide a detailed feature list of the entire feature set available for the device 1100. A view feature category option 1302 can display, upon selection, a category list of the features for the device 1100.

Figure 14:
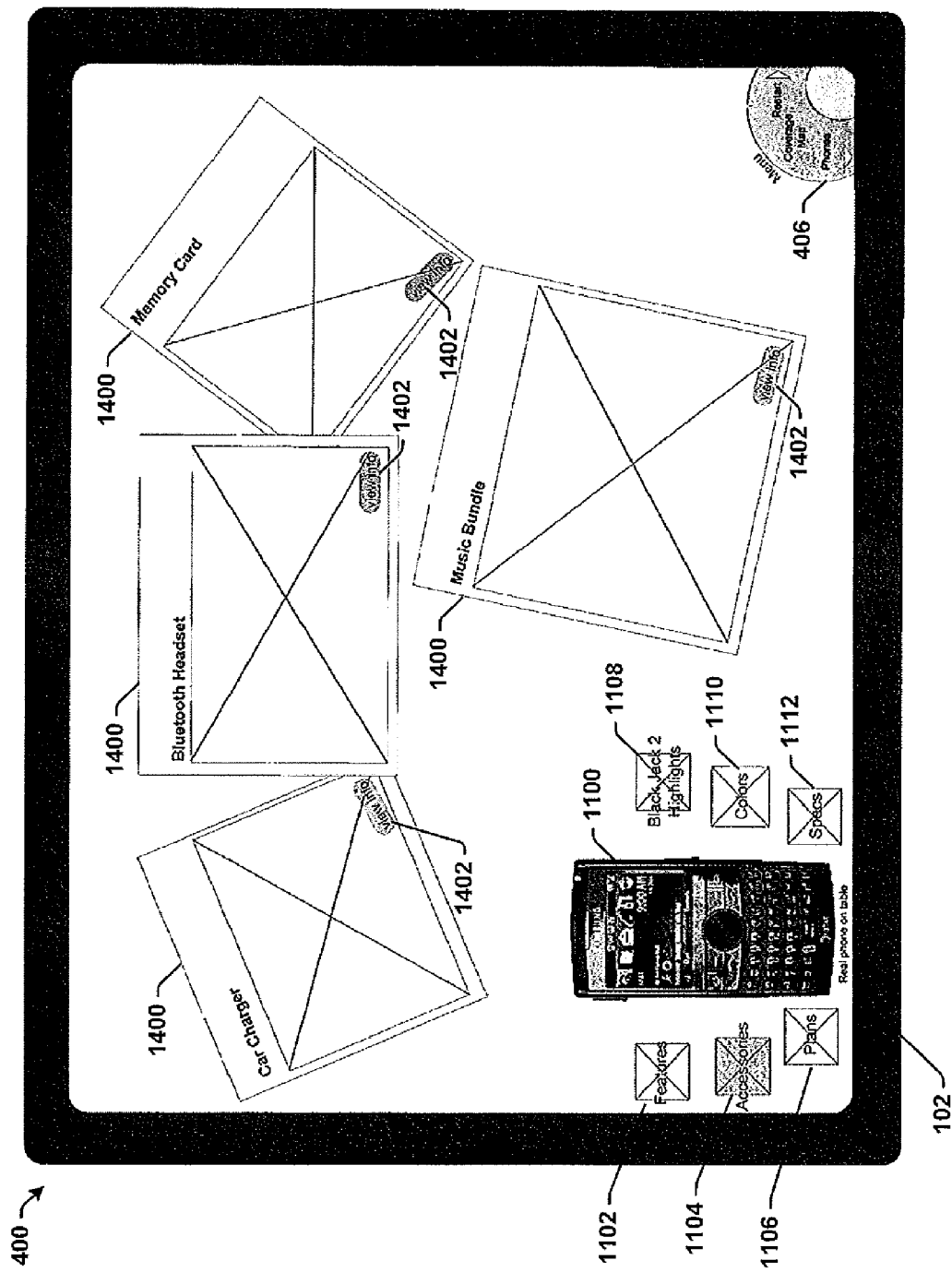

Referring now to FIG. 14, another representative image from a SUI 400 is illustrated, according to an exemplary embodiment of the present disclosure. The illustrated SUI 400 is displayed on the surface interface 102 and includes all the elements of FIG. 11. As illustrated, the accessories option 1104 is selected and accordingly at least one accessory window 1400 can be displayed. An accessory window 1400 can provide an image and/or information regarding at least one accessory. The accessory window 1400 can further include a video demonstration and/or advertisement of the accessory, for example. A view information option 1402 can be provided to access additional information regarding a particular accessory.

Figure 15:
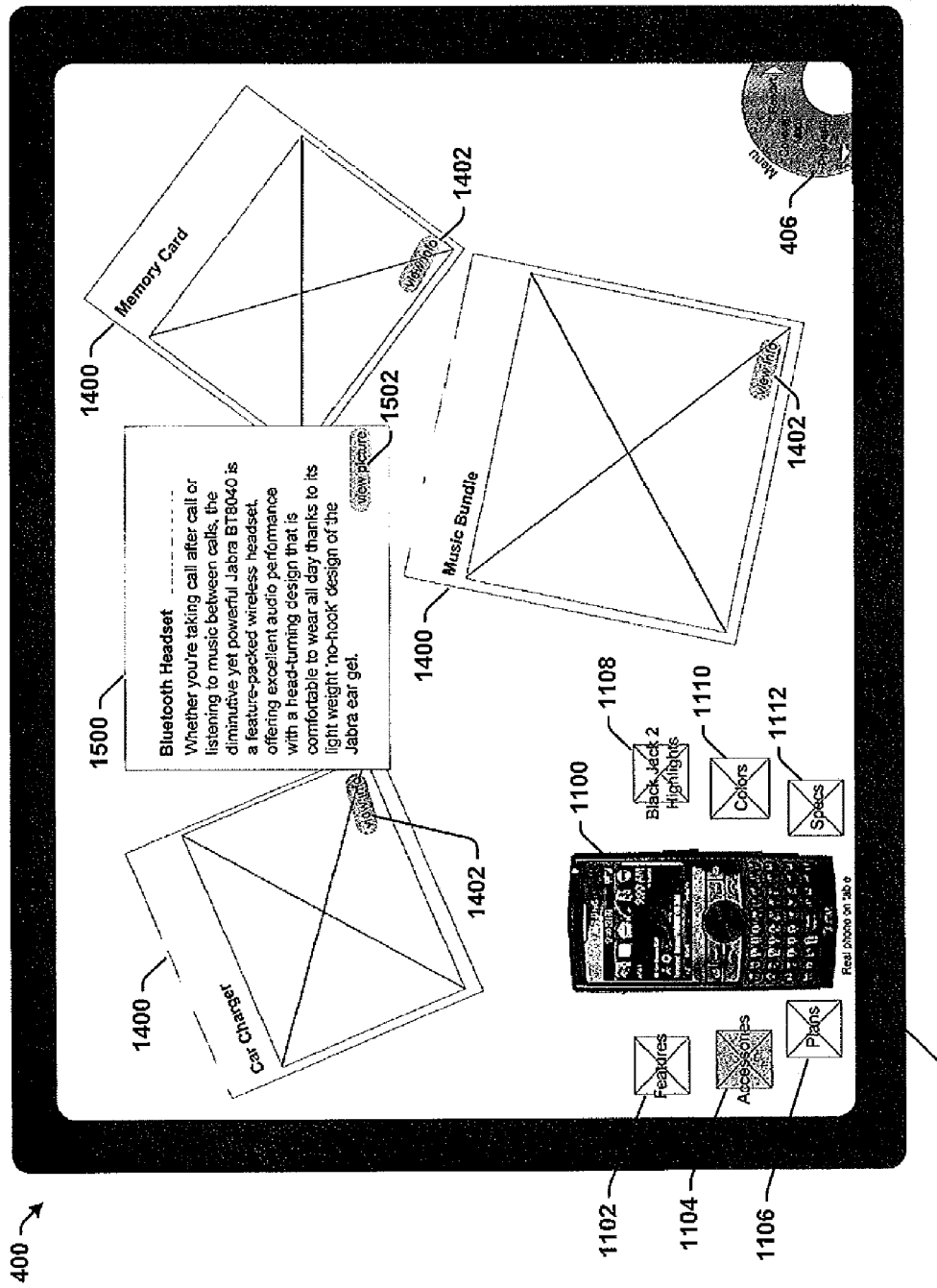

Referring now to FIG. 15, another representative image from a SUI 400 is illustrated, according to an exemplary embodiment of the present disclosure. The illustrated SUI 400 is displayed on the surface interface 102 and includes all the elements of FIG. 11 and the accessory windows 1400 and view information options 1402 of FIG. 14. As illustrated, a view information option 1402 is selected and accordingly an accessory information window 1500 including information regarding the selected accessory is displayed. A view picture option 1502 can be provided to access a picture and/or other visual representation of the selected accessory, such as a video, for example.

Figure 16:
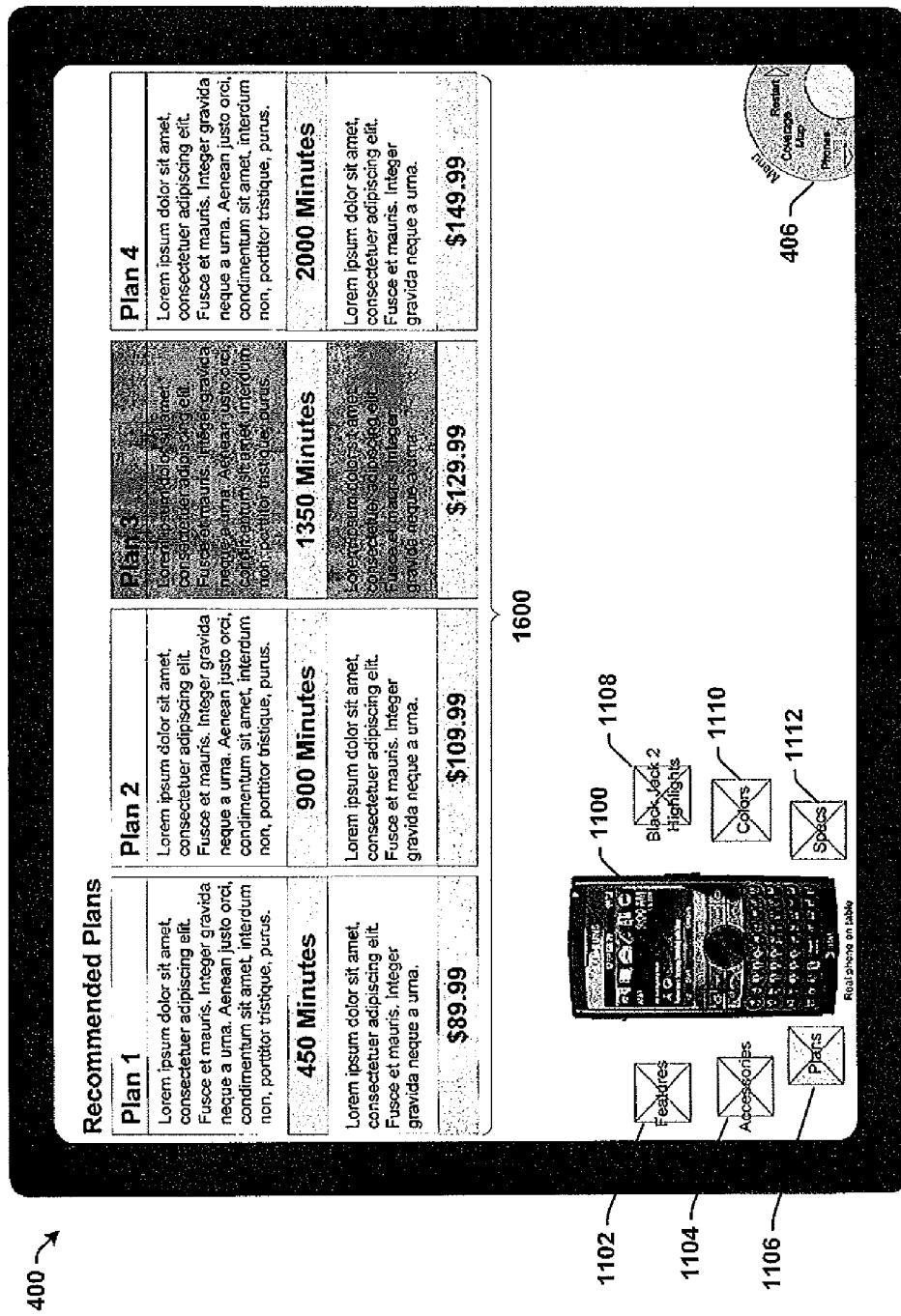

Referring now to FIG. 16, another representative image from a SUI 400 is illustrated, according to an exemplary embodiment of the present disclosure. The illustrated SUI 400 is displayed on the surface interface 102 and includes all the elements of FIG. 11. As illustrated, the subscription plan option 1106 is selected and accordingly at least one plan option 1600 is displayed. The subscription plan data 122 can be used.

Figure 17:
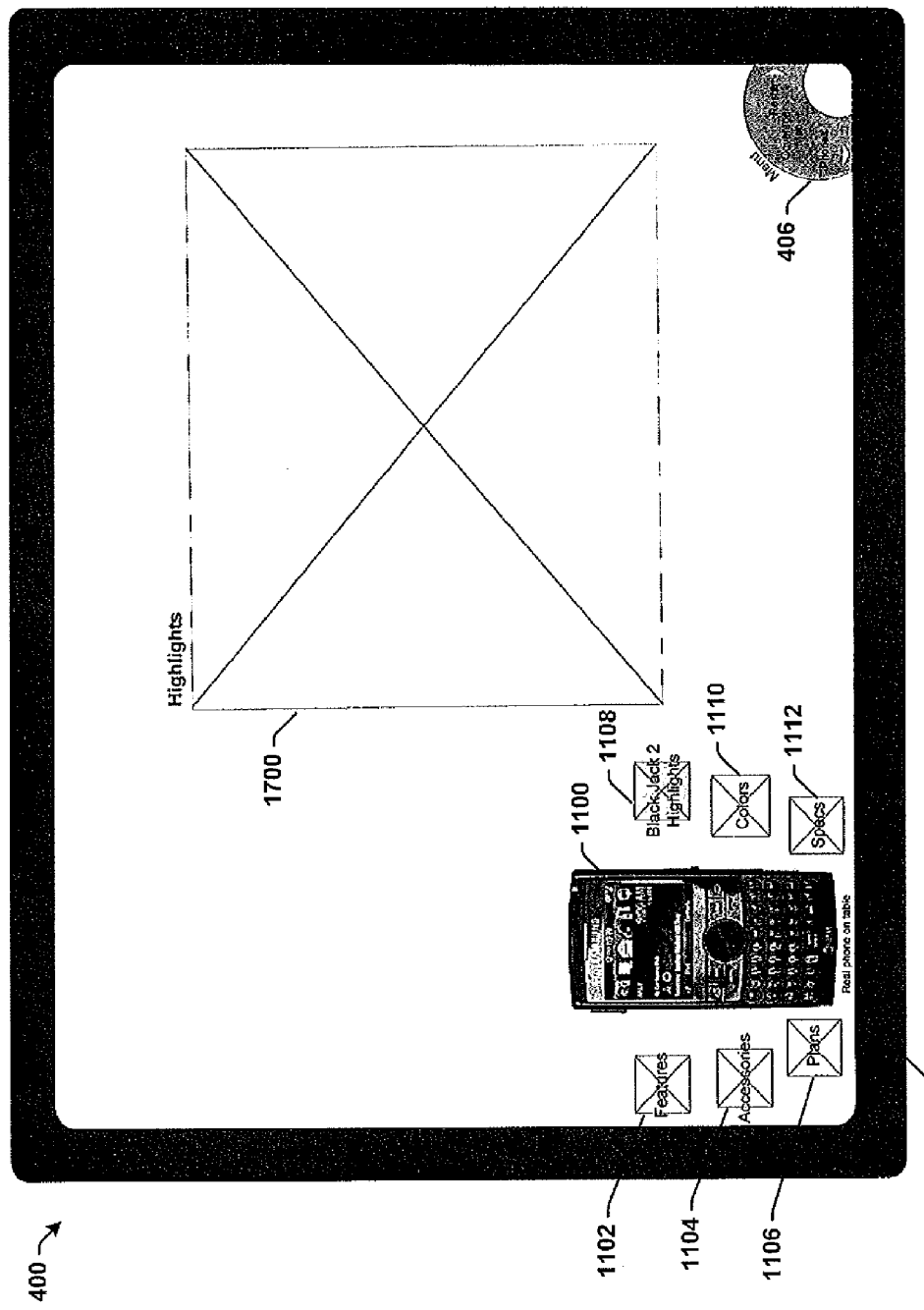

Referring now to FIG. 17, another representative image from a SUI 400 is illustrated, according to an exemplary embodiment of the present disclosure. The illustrated SUI 400 is displayed on the surface interface 102 and includes all the elements of FIG. 11. As illustrated, the device highlights option 1108 is selected and accordingly a highlights window 1700 is displayed. The device data 120 can be used.

Figure 18:
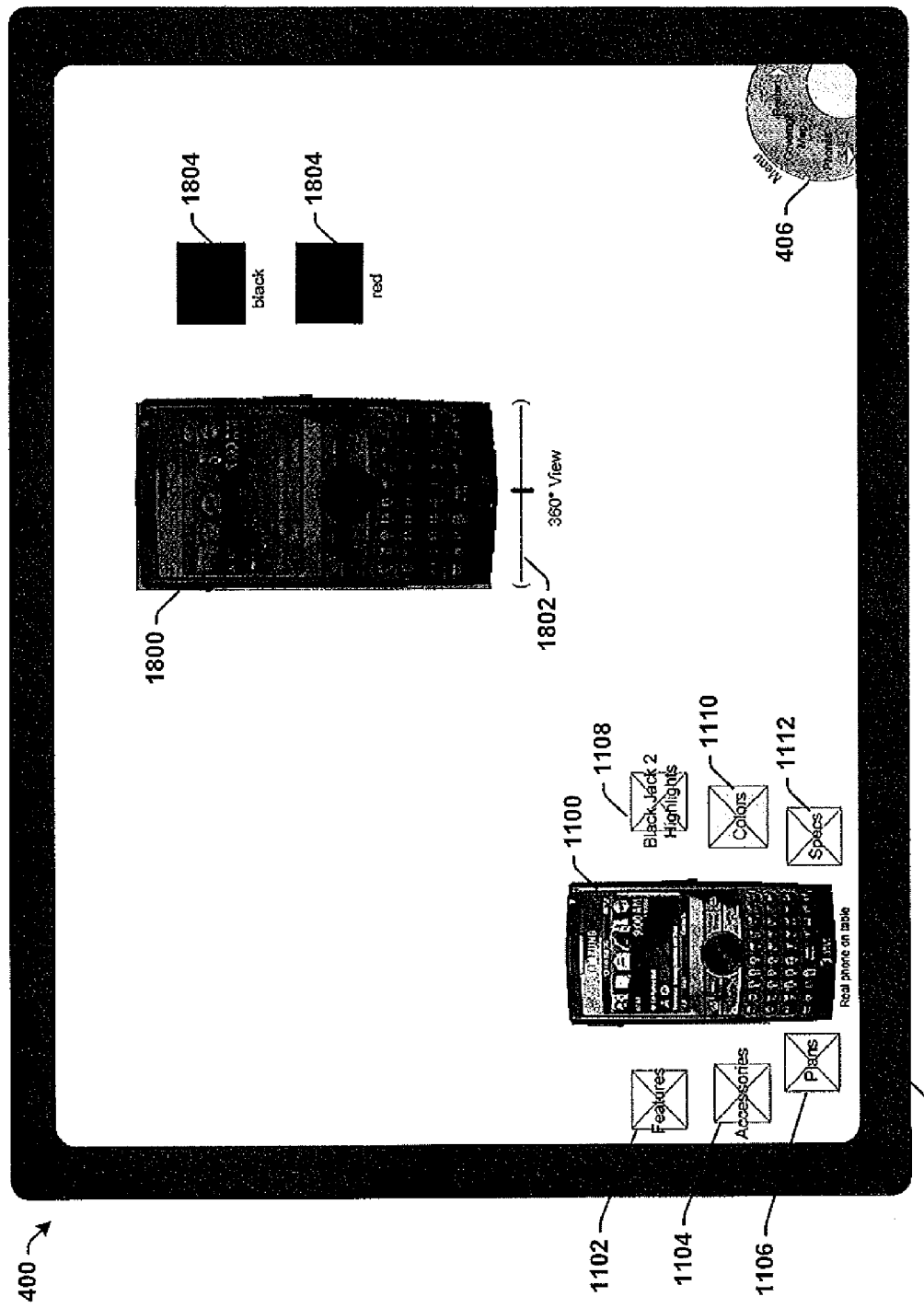

Referring now to FIG. 18, another representative image from a SUI 400 is illustrated, according to an exemplary embodiment of the present disclosure. The illustrated SUI 400 is displayed on the surface interface 102 and includes all the elements of FIG. 11. As illustrated, the device colors option 1110 is selected and accordingly a device image 1800 is displayed with a rotation feature bar 1802 and at least one color option 1804. The rotation feature bar 1802 can provide a 360° rotation feature to view the device image 1800 at any angle. The color option 1804 can be selected by touching a desired color and touching the device image 1800 or dragging the color the device image 1800 to change the device color to the selected color, for example.

Figure 19:
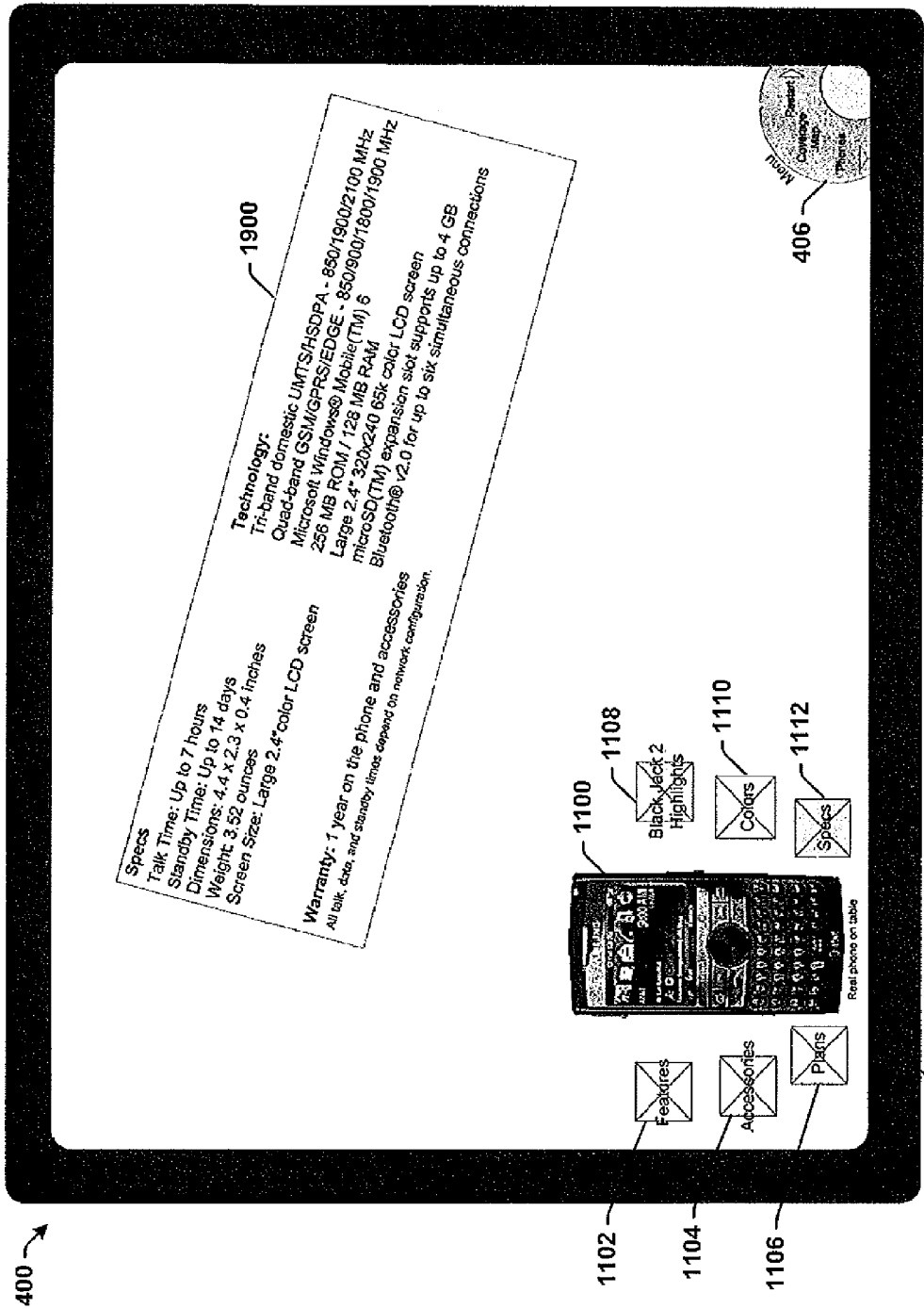

Referring now to FIG. 19, another representative image from a SUI 400 is illustrated, according to an exemplary embodiment of the present disclosure. The illustrated SUI 400 is displayed on the surface interface 102 and includes all the elements of FIG. 11. As illustrated, the device specifications option 1112 is selected and accordingly a device specifications window 1900 is displayed.

Figure 20:
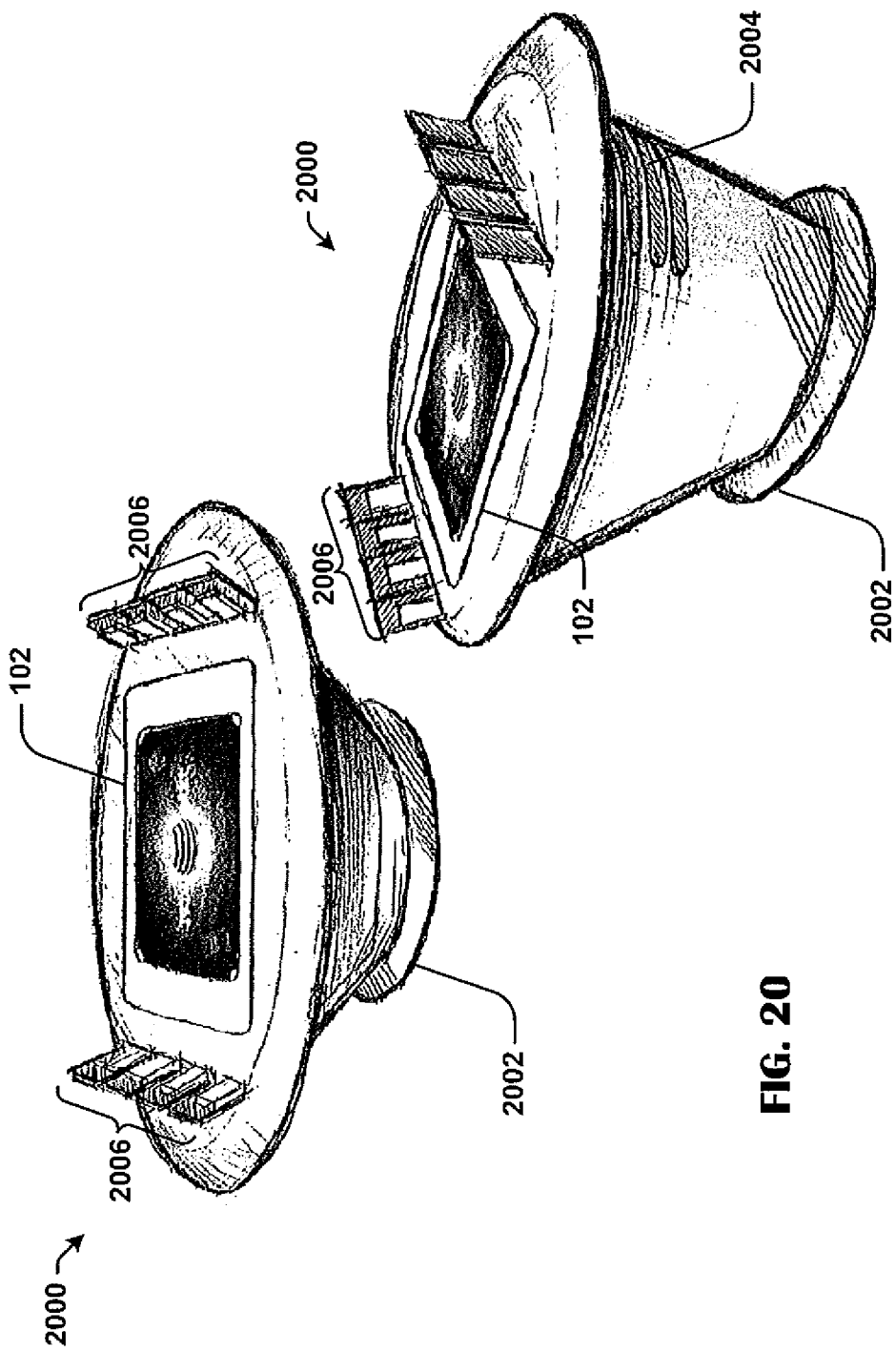
FIG. 20 illustrates view of an exemplary SUI, according to the present description.

Referring now to FIG. 20, a front view and a partial side view of an exemplary table 2000 configured to house a PSS 100 is illustrated, according to an embodiment of the present disclosure. The illustrated table 2000 includes a base 2002 for supporting the PSS 100, at least one vent 2004 to provide adequate air circulation and heat dispersion, and at least one device holder 2006 to hold at least one device when not in use with the surface interface 102. Other table configurations with respect to size, shape, position (horizontal vs. vertical), styling, and branding are contemplated.

Figure 21:
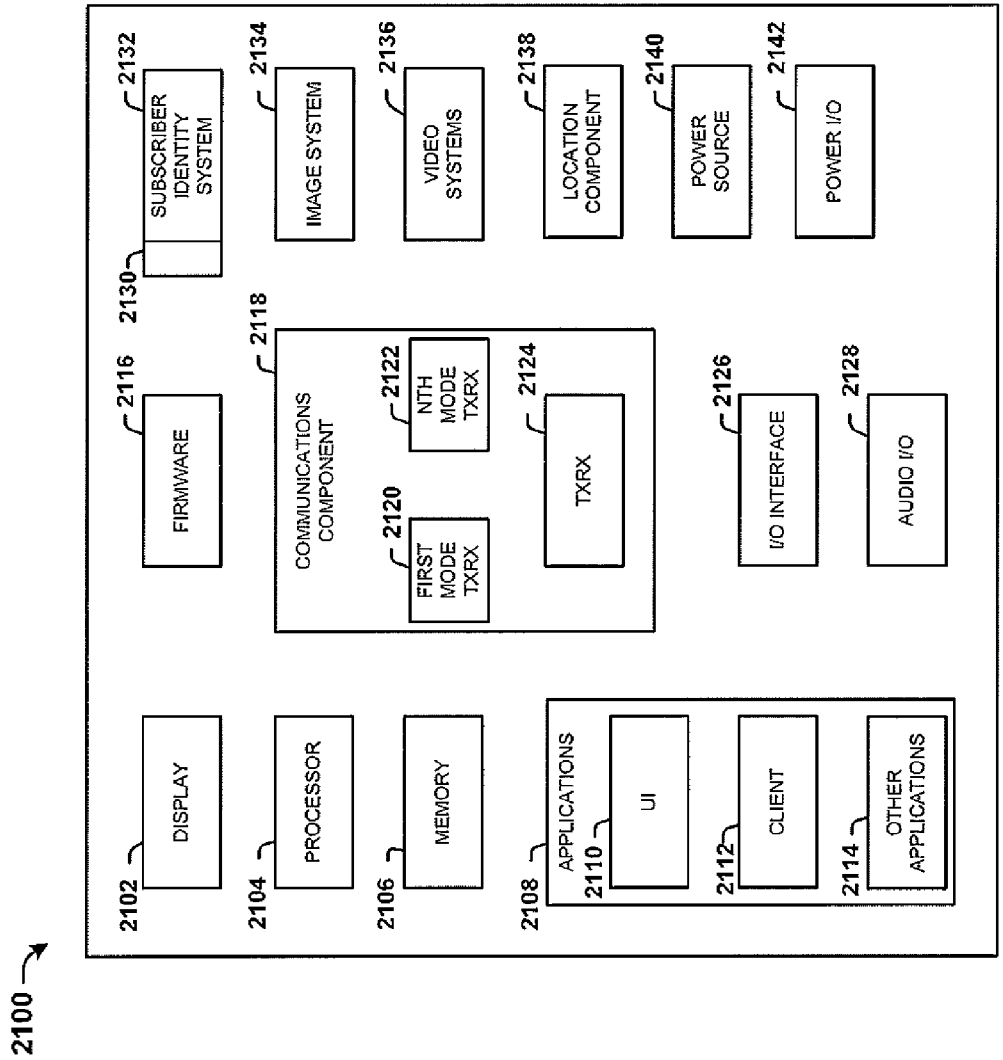
FIG. 21 schematically illustrates an exemplary mobile device for use with an exemplary SUI and exemplary PSS, according to the present description.

FIG. 21 is a schematic block diagram illustrating an exemplary mobile device 2100 for use in accordance with an exemplary embodiment of the present disclosure. Although no connections are shown between the components illustrated and described in FIG. 21, the components can interact with each other to carry out device functions.

As illustrated, the mobile device 2100 can be a multimode handset. FIG. 21 and the following discussion are intended to provide a brief, general description of a suitable environment in which the various aspects of an embodiment of the present disclosure can be implemented. While the description includes a general context of computer-executable instructions, the present disclosure can also be implemented in combination with other program modules and/or as a combination of hardware and software.

Generally, applications can include routines, program modules, programs, components, data structures, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like.

The illustrated device 2100 includes a display 2102 for displaying data such as, for example, text, images, video, video games, telephony functions, visual voicemail data, caller line ID data, setup functions, menus, music metadata, messages, wallpaper, graphics, and the like. The device 2100 can also include a processor 2104 for controlling, and/or processing data. A memory 2106 can interface with the processor 2104 for the storage of data and/or applications 2108. The memory 2106 can include a variety of computer readable media, including volatile media, non-volatile media, removable media, and non-removable media. Computer-readable media can include device storage media and communication media. Storage media can include volatile and/or non-volatile, removable and/or non-removable media such as, for example, RAM, ROM, EEPROM, flash memory or other memory technology, CD ROM, DVD, or other optical disk storage, magnetic tape, magnetic disk storage or other magnetic storage devices, or any other medium that can be used to store the desired information and that can be accessed by the device 2100.

The memory 2106 can be configured to store one or more applications 2108. The applications 2108 can include a user interface (UI) application 2110. The UI application 2110 can interface with a client 2112 (e.g., an operating system) to facilitate user interaction with device functionality and data, for example, managing voicemails in a visual voicemail application, answering/initiating calls, entering/deleting data, configuring settings, address book manipulation, multimode interaction, and the like. The applications 2108 can include other applications 2114 such as, for example, diagnostic software, visual voicemail software, add-ons, plug-ins, voice recognition software, call voice processing, voice recording, messaging, e-mail processing, video processing, image processing, music play, video games, productivity application, combinations thereof, and the like, as well as subsystems and/or components thereof. The applications 2108 can be stored in the memory 2106 and/or in a firmware 2116, and can be executed by the processor 2104. The firmware 2116 can also store code for execution during initialization of the device 2100. In some embodiments, the applications 2108 and the firmware 2116 can be updated via the PSS 100.

A communications component 2118 can interface with the processor 2104 to facilitate wired/wireless communications with external systems including, for example, cellular networks, VoIP networks, LAN, WAN, MAN, PAN, that can be implemented using Wi-Fi®, WiMax, combinations and/or improvements thereof, and the like. The communications component 2118 can also include a multimode communications subsystem for providing cellular communications via different cellular technologies. For example, a first cellular transceiver 2120 can operate in one mode, for example, GSM, and an Nth transceiver 2122 can operate in a different mode, for example Wi-Fi®. While only two transceivers 2120, 2122 are illustrated, it should be appreciated that a plurality of transceivers can be included. The communications component 2118 can also include a transceiver 2124 for unlicensed RF communications using technology such as, for example, Wi-Fi®, WiMax, NFC, other RF and the like. The transceiver 2124 can also be configured for line-of-sight technologies, such as, for example, infrared and IRDA. Although a single transceiver 2124 is illustrated multiple transceivers for unlicensed RF and line-of-sight technologies are contemplated.

The communications component 2118 can also facilitate communications reception from terrestrial radio networks, digital satellite radio networks, Internet-based radio services networks, combinations thereof, and the like. The communications component 2118 can process data from a network, such as, for example, the Internet, a corporate intranet, a home broadband network, and the like, via an ISP, DSL provider, or other broadband service provider.

An input/output (I/O) interface 2126 can be provided for input/output of data and/or signals. The I/O interface 2126 can be a hardwire connection, such as, for example, a USB, PS2, IEEE 1394, serial, parallel, IEEE 802.3 (e.g., Ethernet—RJ45, RJ48), traditional telephone jack (e.g., RJ11, RJ14, RJ25) and the like, and can accept other I/O devices, such as, for example, a keyboard, keypad, mouse, interface tether, stylus pen, printer, plotter, jump/thumb drive, touch screen, touch pad, trackball, joy stick, controller, monitor, display, LCD, combinations thereof, and the like.

Audio capabilities can be provided by an audio I/O component 2128 that can include a speaker (not shown) for the output of audio signals and a microphone (not shown) to collect audio signals.

The device 2100 can include a slot interface 2130 for accommodating a subscriber identity system 2132, such as, for example, a SIM or universal SIM (USIM). The subscriber identity system 2132 instead can be manufactured into the device 2100, thereby obviating the need for a slot interface 2130.

The device 2100 can include an image capture and processing system 2134. Photos and/or videos can be obtained via an associated image capture subsystem of the image system 2134, for example, a camera. The device 2100 can also include a video systems component 2136 for processing, recording, and/or transmitting video content.

A location component 2138 can be included to send and/or receive signals, such as, for example, GPS data, assisted GPS data, triangulation data, combinations thereof, and the like. The device 2100 can use the received data to identify its location or can transmit data used by other devices to determine the device 2100 location.

The device 2100 can include a power source 2140 such as batteries and/or other power subsystem (AC or DC). The power source 2140 can be single-use, continuous, or rechargeable. In the case of the latter, the power source 2140 can interface with an external power system or charging equipment via a power I/O component 2142.

Figure 22:
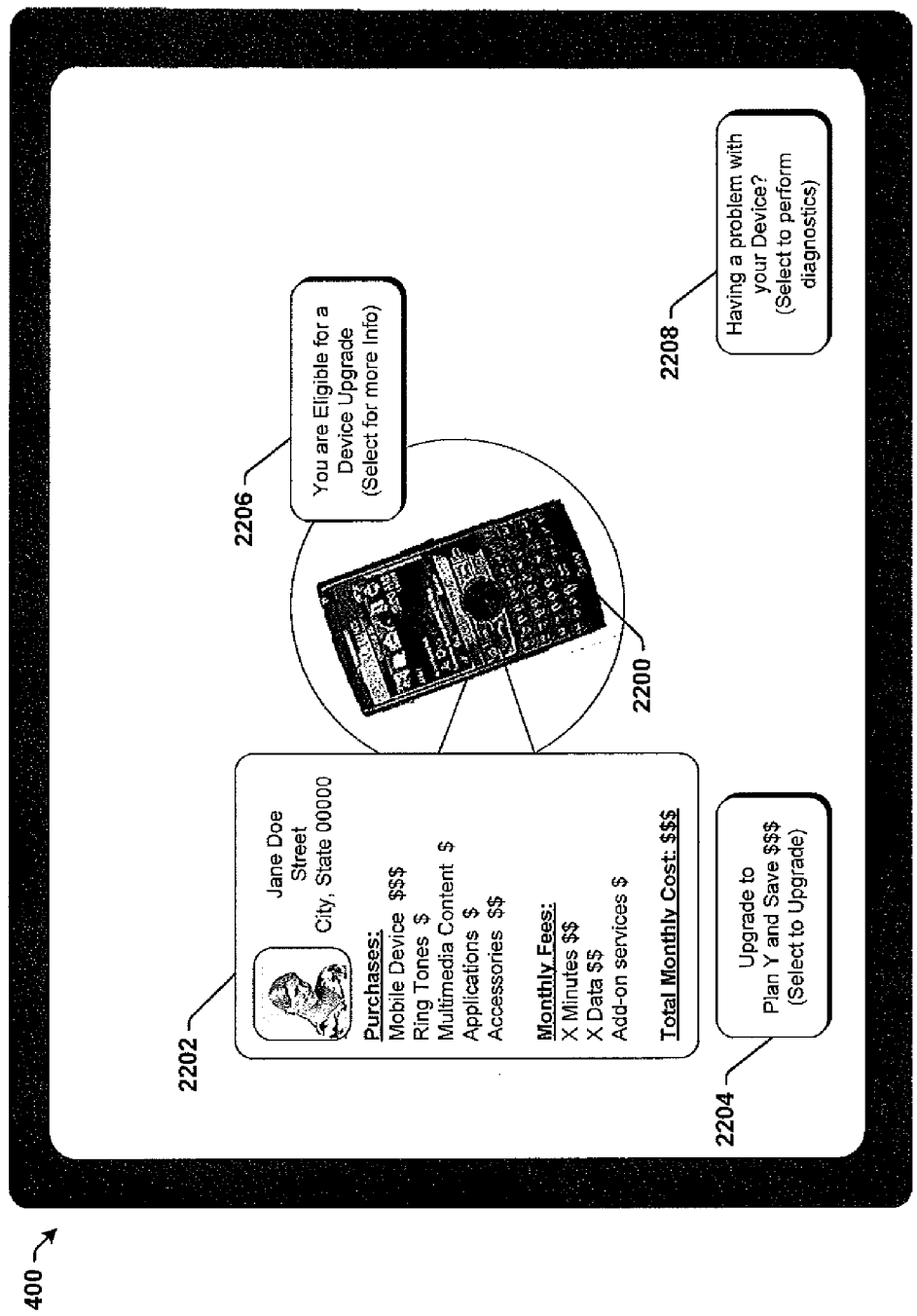
FIGS. 22-24 show representative images from an exemplary SUI, according to the present description.

Referring now to FIG. 22, another representative image from a SUI 400 is illustrated, according to an exemplary embodiment of the present disclosure. The illustrated SUI 400 is displayed on the surface interface 102. The illustrated SUI 400 includes a customer device 2200 that has been placed on the surface interface 102 and recognized via a tag or communications established between the customer device 2200 and the PSS 100. The customer device 2200 is associated with a customer "Jane Doe" and a customer summary 2202 is illustrated to the left of the device 2200. The illustrated customer summary 2202 includes a customer name, a customer address, a summary of equipment and content purchases including the device 2200, purchased ring tones, purchased multimedia content, purchased applications, and purchased accessories, and a summary of monthly fees associated with the customer's wireless account. Other information can be included in the customer summary 2202 including, but not limited to, usage history, contacts, battery level, firmware version, OS version, other application versions, diagnostic information, and the like.

The SUI 400 also includes a plan upgrade option 2204 that can be displayed if it is determined by the PSS 100 or another system in communication with the PSS 100 that the customer could benefit from an upgraded plan based upon recent or long-term historical usage data. For example, suppose a customer has used 1500 minutes the past month but is subscribed to a 1250 minute per month plan and, historically, the customer averages a few minutes over 1250. Accordingly, the PSS 100 or an external system can determine that the cost for the customer to upgrade their account may be worth it so the customer does not incur any further overage charges. The customer can select the plan upgrade option 2204 and the PSS 100 will guide the customer through completing a plan upgrade.

The SUI 400 also includes a device upgrade option 2206 that can be displayed if it is determined by the PSS 100 or another system in communication with the PSS 100 that the customer is eligible to upgrade their device based upon a customer-specific promotion (e.g., how long the customer's account has been active), or another promotion, for example. Alternatively, the device upgrade option 2206 may be displayed if it is determined by the PSS 100 or other system in communication with the PSS 100 that updates necessary to improve or upgrade performance of the device 2200 are not available, or other criteria, for example. The customer can select the device upgrade option 2206 to view, compare, and otherwise research devices that are available to the customer.

The SUI 400 also includes a device diagnostics option 2208. The device diagnostics option 2208 can be displayed by default and the customer can select it if they are experiencing a problem with their device. Alternatively, the device diagnostics option 2208 can be displayed if the PSS 100 detects a problem with the device. The PSS 100 can be configured to run one or more diagnostic tests to determine whether the device is running properly. The diagnostic tests can be manufacturer-specific, model-specific, application-specific, or generic to multiple devices, for example. The diagnostic tests can be performed with or without interaction of the customer based upon the type of test. For example, a display test can be used to isolate dead or stuck pixels and may require the customer to view the device and provide feedback as to whether a deformity exists in the display. It is contemplated that the PSS 100 can remotely control the device to extract diagnostic data or instruct the customer or a sales associate to perform certain tasks to facilitate some of the tests. The diagnostic tests can include, but are not limited to, display tests, processor performance tests, memory tests, application tests, firmware version checks, OS version checks, application version checks, communications component performance tests, I/O interface tests, audio tests, video tests, SIM tests, GPS and location component tests, battery tests, power I/O tests, combinations thereof, and the like.

Figure 23:
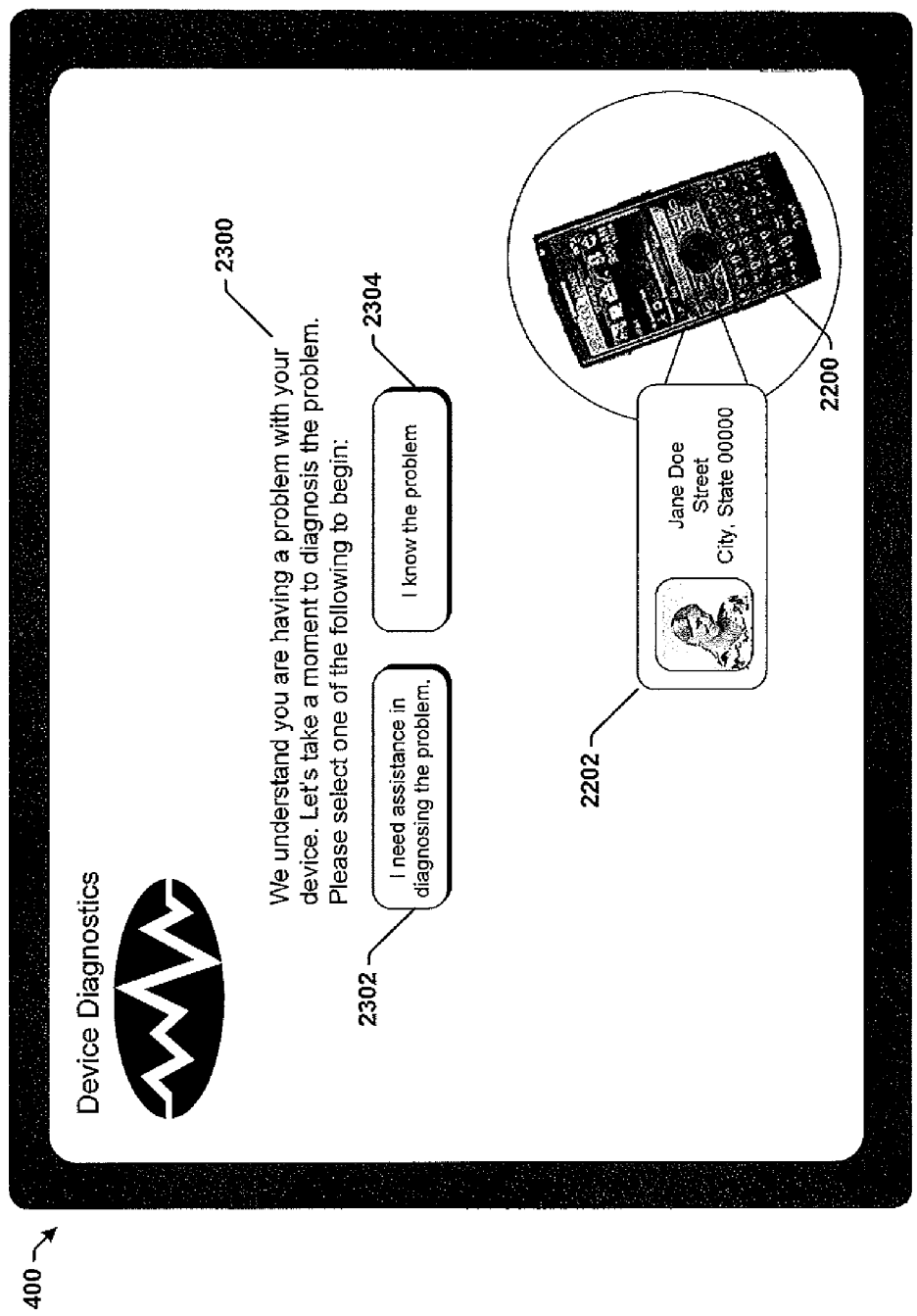

Referring now to FIG. 23, another representative image from a SUI 400 is illustrated, according to an exemplary embodiment of the present disclosure. In the present view, the device diagnostics option 2208 has been selected by the customer or automatically forced by the PSS 100 due to detection of one or more problems on the device 2200 via one or more diagnostic tests as described above. The present view illustrates a text box 2300 acknowledging the existence of a problem on the device 2200 and prompting the customer to select a first option 2302 to assist the customer in diagnosing the problem and a second option 2304 to let the customer explain the problem. If the latter option 2304 is selected, the customer can be further prompted to select an entry method including voice recognition, typing the problem, or selecting the option from a menu system, for example. It is further contemplated that a keyword, problem code, or other like code can be entered to identify the problem. For example, a device manual can include error codes that can be presented to the customer to enter into the PSS 100.

If the first option 2302 is selected, the customer can be guided through a questionnaire, a symptom check, or other menu-driven system whereby the customer can interact with the PSS 100 to narrow down the potential problem. Once the PSS 100 has sufficient information to proceed, the PSS 100 can initiate one or more diagnostic tests.

Figure 24:
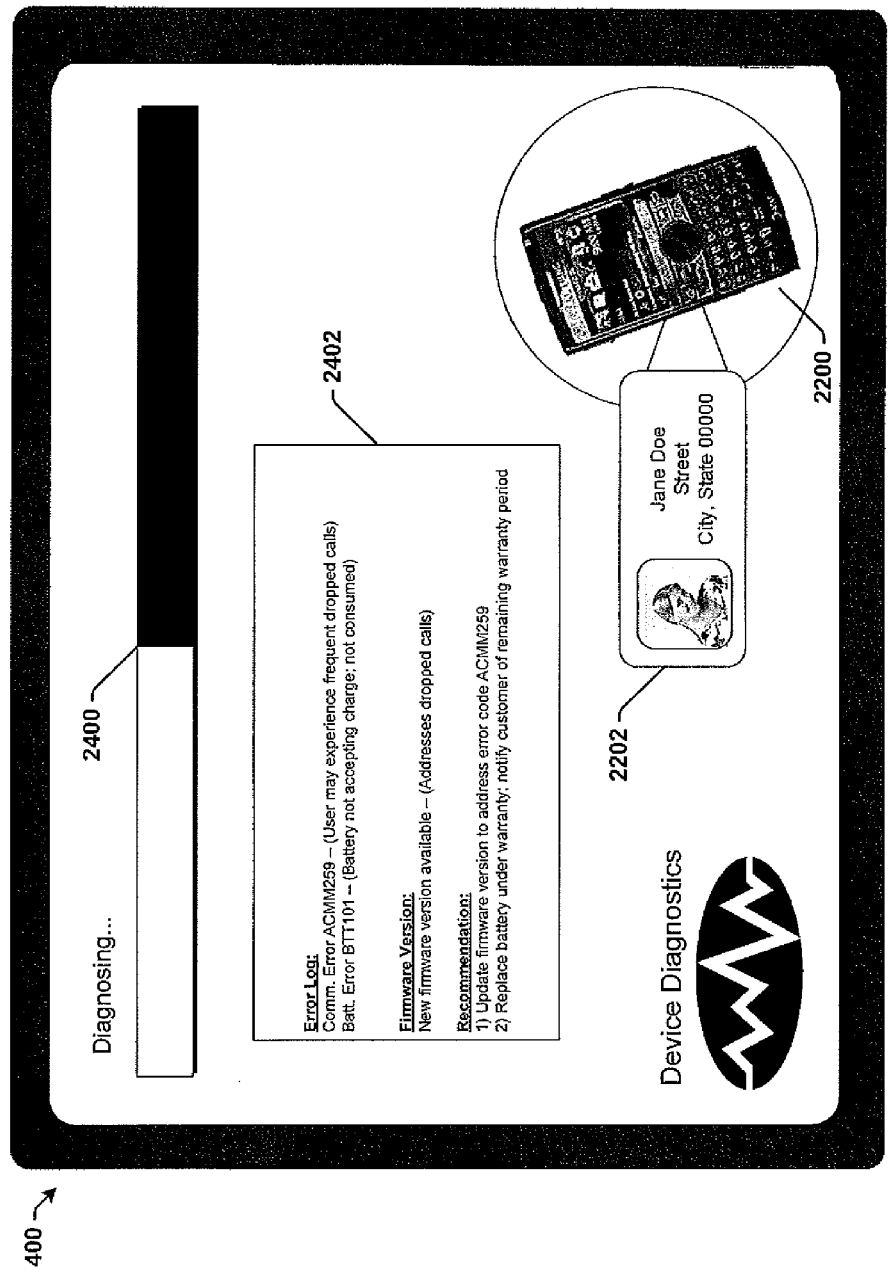

Referring now to FIG. 24, another representative image from a SUI 400 is illustrated, according to an exemplary embodiment of the present disclosure. In the present view, the PSS 100 has determined through customer interaction or automatically that device diagnostics need to be performed to address one or more problems. The present view illustrates, the device 2200, an abbreviated customer summary 2202, a diagnostic test status bar 2400, and a diagnostic summary 2402.

The diagnostic summary 2402 can be used by the PSS 1000 to present relevant diagnostic data to a user. The illustrated diagnostic summary 2402 includes an error log identifying a communications component error and a battery error. A brief description of each symptom associated with the error is also provided. Additional or alternative information can be included in the error log. Some devices may not be compatible with an error code system. Problems with these devices can be assessed based on actual performance data retrieved from the diagnostic tests. For example, a communications-type error may be determined by a device failing to communicate voice and/or data within the specifications for the device an intervening networks. For additional example, a battery-type error may be determined by a device failing a battery test.

The illustrated diagnostic summary 2402 also includes an indication that a new firmware version is available and a list of applicable problems that are addressed in the firmware version. This list can be expanded to show all problems address by the firmware version or minimized merely to show the user that a new firmware version is available and the device should be updated.

The illustrated diagnostic summary 2402 also includes a recommendation to update the firmware to address the communications error and replace the battery under warranty. Device, battery, and accessory warranty information can be included in the device data 120 or account data 128, for example.

Figure 25:
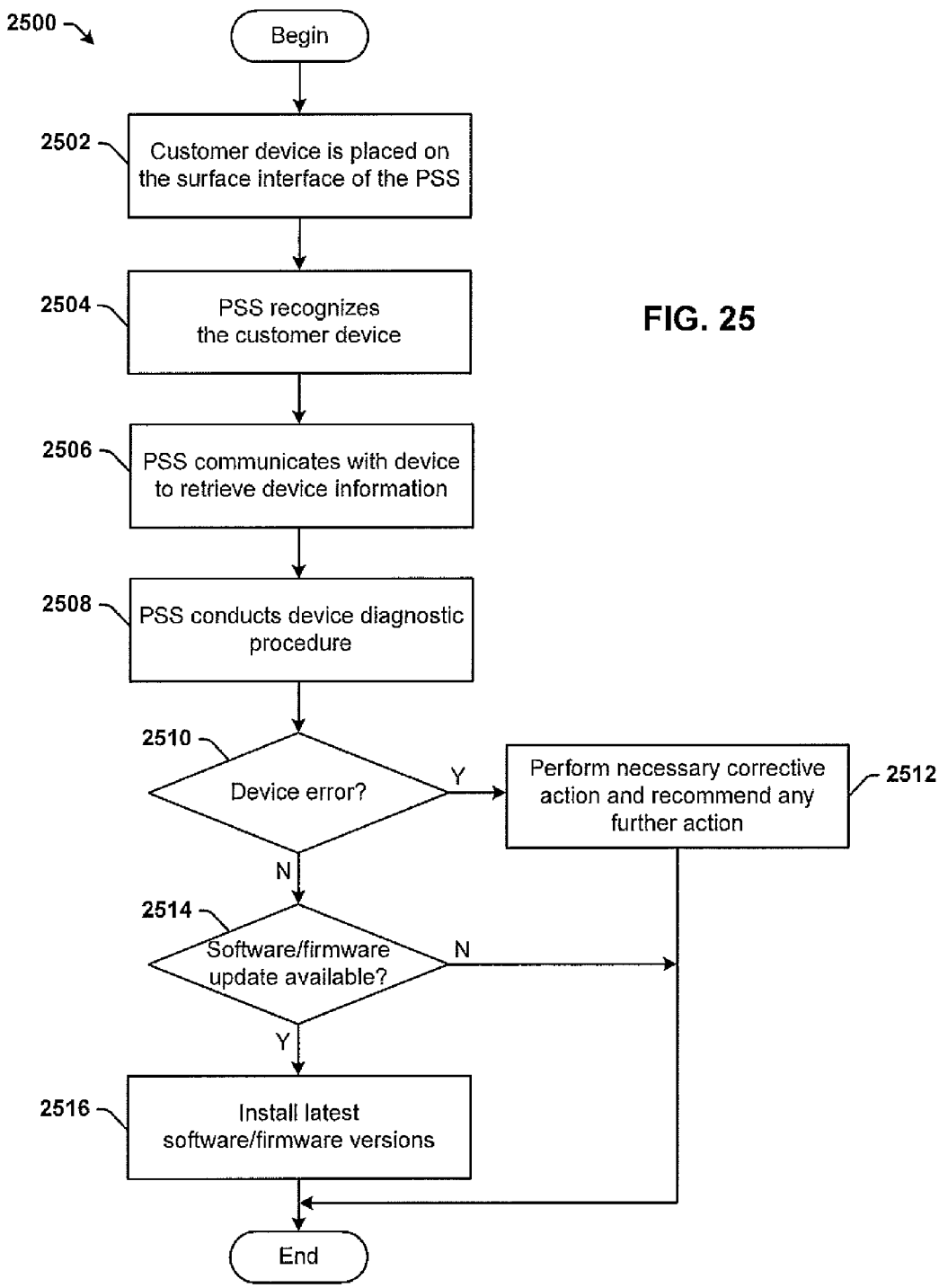
FIG. 25 schematically illustrates an exemplary method of operating an exemplary PSS, according to the present description.

FIG. 25 schematically illustrates a method 2500 for operating a PSS 100, according to an exemplary embodiment of the present disclosure. It should be understood that the steps of the method 2500 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 2500 can be ended at any time. Some or all steps of this process, and/or substantially equivalent steps, can be performed by execution of computer readable instructions included on a computer readable medium, such as the memory 108.

The method 2500 begins and flow proceeds to block 2502 wherein a customer device is placed on the surface interface 102 of the PSS 100. At block 2504, the PSS 100 recognizes the customer device and at block 2506 communicates with the device to retrieve device and account data.

At block 2508, the PSS 100 conducts a device diagnostic procedure including one or more of the above-described diagnostic tests. The diagnostic procedure can begin automatically in an attempt to detect a problem with the device. Alternatively, the diagnostic procedure can begin in response to the customer indicating that there is a problem with the device, such as by selecting the device diagnostics option 2208, for example.

During the device diagnostic procedure, the PSS 100 can determine, at block 2510, whether a device error is present. If one or more errors are present, the PSS 100 can perform the necessary corrective action to remedy the error and recommend any further action necessary to fix the errors, at block 2512. A corrective action, for example, can include updating firmware, updating software, removing malicious software, removing viruses, any combination thereof, and the like. In addition, the PSS 100 can recommend a further action be taken to fully address the error. A recommended action can take the form of instructions to the customer or a technician to perform a hardware replacement, such as a processor, a memory, a circuit board, a communications interface, a speaker, a microphone, a screen, a battery, or any of the device components illustrated in FIG. 21, for example. Generally, a recommended action is an action that can not be completed by the PSS 100 without intervention of a technician or the customer. In some instances, however, the recommended action may involve deleting or otherwise changing permissions on a device such that one or more features or applications are no longer accessible to the customer. For example, a new firmware may be required to correct a communications issue related to dropped calls, but the new firmware may not be compatible with an application that is present on the device. Accordingly, the recommended action may serve as a prompt whereby the customer or a technician can accept or decline the upgrade. In such a case the customer may be able to accept the dropped call problem but unable to accept one or more applications being incompatible with the new firmware. The method 2500 can end.

If one or more errors are not detected, at block 2514, the PSS 100 can determine whether a device firmware and/or software update is available for the device. If no updates are available, the method device serial number 2500 can end. If updates are available, the PSS 100 can install the latest (or compatible) software and/or firmware versions, at block 2516 and the method 2500 can end.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A system, for providing device diagnostics, comprising:
   a processor;
   a surface interface in communication with the processor, the surface interface comprising:
     a multi-touch interface to detect multiple simultaneous inputs; and
     an object recognition interface to communicate wirelessly with a customer device upon the customer device being placed in communication with the surface interface; and
   a memory in communication with the processor, the memory comprising a system application configured to cause the processor to:
     recognize, wirelessly, by way of the surface interface, and without a user input, the customer device when the customer device is placed in communication with the surface interface;
     conduct, wirelessly, by way of the surface interface, and without a user input, a diagnostic test to determine whether the customer device is operating without error;
     display a diagnostic screen on the surface interface in response to the diagnostic test detecting an error in operation of the customer device; and
     perform, wirelessly, by way of the surface interface, a corrective action if in response to the diagnostic test detecting the error in operation of the customer device.

2. The system of claim 1, wherein the system application being configured to cause the processor to conduct the diagnostic test, wirelessly, causes the processor to conduct one of a display test, a processor performance test, a memory test, an application performance test, a firmware version check, an OS version check, an application version check, and a device component test.

3. The system of claim 1, wherein the system application being configured to cause the processor to perform corrective action, wirelessly, causes the processor to perform at least one act selected from a group of acts consisting of: updating firmware, updating software, removing malicious software, and removing a virus.

4. The system of claim 1, wherein the system application is configured to cause the processor to recognize the customer device, wirelessly by way of the surface interface, when the customer device is placed in communication with the surface interface by reading a tag on the customer device.

5. The system of claim 1, wherein the system further comprises a short range communications interface and the surface application is configured to cause the processor to recognize the customer device, wirelessly by way of the surface interface, when the customer device is placed in communication with the surface interface by communicating, by way of the short range communications interface, with the device using a short range communications protocol.

6. The system of claim 1, wherein the system application, configured to cause the processor to recognize the customer device, is configured to cause the processor to recognize the customer device when the customer device is placed in wireless communication with the surface interface.

7. The system of claim 1, wherein the system application, configured to cause the processor to recognize the customer device, is configured to cause the processor to recognize the customer device when the customer device is placed on the surface interface.

8. A computer-readable storage medium comprising computer-executable instructions that, when executed by a processor, cause the processor to perform of a method comprising:
   recognizing, wirelessly, by way of a surface interface, and without a user input, a customer device when the customer device is placed in communication with the surface interface;
   conducting, wirelessly, by way of the surface interface, a diagnostic test to determine whether the customer device is operating without error;
   displaying a diagnostic screen on the surface interface in response to the diagnostic test detecting an error in operation of the customer device; and
   performing, wirelessly, by way of the surface interface, a corrective action in response to the diagnostic test detects detecting the error in operation of the customer device.

9. The computer-readable storage medium of claim 8, wherein conducting the diagnostic test, wirelessly, by way of the surface interface, comprises conducting one of a display test, a processor performance test, a memory test, an application performance test, a firmware version check, an OS version check, an application version check, and a device component test.

10. The computer-readable storage medium of claim 8, wherein performing, wirelessly, by way of the surface interface, the corrective action comprises performing one of updating firmware, updating software, removing malicious software, and removing a virus.

11. The computer-readable storage medium of claim 8, wherein recognizing, wirelessly, by way of the surface interface, the customer device when the customer device is placed in communication with the surface interface comprising reading a tag on the customer device.

12. The computer-readable storage medium of claim 8, wherein recognizing, wirelessly, by way of the surface interface, the customer device when the customer device is placed in communication with the surface interface includes communicating, through a short range communications interface, with the device using a short range communications protocol.

13. The computer-readable storage medium of claim 8, wherein the processor recognizes the customer device when the customer device is placed in wireless communication with the surface interface.

14. The computer-readable storage medium of claim 8, wherein the processor recognizes the customer device when the customer device is placed on the surface interface.

15. A method for providing device diagnostics at a system having a processor and a memory, the system being in communication with a surface interface, the memory comprising a system application, the method comprising:
   recognizing, wirelessly, without a user input, via the surface interface, a customer device when the customer device is placed in communication with the surface interface;
   conducting, wirelessly, using the processor, a diagnostic test to determine whether the customer device is operating without error;
   displaying a diagnostic screen on the surface interface in response to the diagnostic test detecting an error in operation of the customer device; and
   performing, wirelessly, using the processor, a corrective action in response to the diagnostic test detecting the error in operation of the customer device.

16. The method of claim 15, wherein conducting, wirelessly, using the processor, the diagnostic test comprises conducting one of a display test, a processor performance test, a memory test, an application performance test, a firmware version check, an OS version check, an application version check, and a device component test.

17. The method of claim 15, wherein performing, wirelessly, using the processor, the corrective action comprises performing one of updating firmware, updating software, removing malicious software, and removing a virus.

18. The method of claim 15, wherein recognizing, wirelessly, without a user input, the customer device when the customer device is placed in communication with the surface interface comprises reading, wirelessly, a tag on the customer device.

19. The method of claim 15, wherein recognizing, wirelessly, without a user input, the customer device when the customer device is placed in communication with the surface interface comprises communicating, wirelessly, through a short range communications interface, with the device using a short range communications protocol.

20. The method of claim 15, wherein recognizing the customer device is placed in wireless communication with the surface interface.

* * * * *